(12) United States Patent
Wu et al.

(10) Patent No.: US 12,007,911 B2
(45) Date of Patent: Jun. 11, 2024

(54) SYSTEM AND METHOD FOR EFFICIENTLY OBTAINING INFORMATION STORED IN AN ADDRESS SPACE

(71) Applicant: Samsung Electronics Co., Ltd., Gyeonggi-do (KR)

(72) Inventors: Chun-Chu Chen-Jhy Archie Wu, San Carlos, CA (US); Sumanth Jannyavula Venkata, Pleasanton, CA (US); Young deok Kim, San Jose, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/874,962

(22) Filed: Jul. 27, 2022

(65) Prior Publication Data
US 2023/0289300 A1    Sep. 14, 2023

Related U.S. Application Data

(60) Provisional application No. 63/318,534, filed on Mar. 10, 2022.

(51) Int. Cl.
*G06F 12/14* (2006.01)
*H04L 9/32* (2006.01)

(52) U.S. Cl.
CPC ........ *G06F 12/1408* (2013.01); *H04L 9/3242* (2013.01); *G06F 2212/1052* (2013.01)

(58) Field of Classification Search
CPC ............. G06F 12/1408; G06F 12/1466; H04L 9/3242; H04L 9/0822
See application file for complete search history.

(56) References Cited

U.S. PATENT DOCUMENTS

| | | | |
|---|---|---|---|
| 6,651,099 B1 | 11/2003 | Dietz et al. | |
| 7,093,099 B2 | 8/2006 | Bodas et al. | |
| 7,668,851 B2 | 2/2010 | Triplett | |
| 7,827,218 B1 | 11/2010 | Mittal | |
| 8,005,227 B1 | 8/2011 | Linnell et al. | |
| 8,307,098 B1 | 11/2012 | Atkins et al. | |

(Continued)

FOREIGN PATENT DOCUMENTS

| | | |
|---|---|---|
| CN | 111459846 | 7/2020 |
| CN | 113505130 | 10/2021 |

(Continued)

OTHER PUBLICATIONS

Anonymous: "Double Hashing", Internet Citation, XP-002762008, Apr. 23, 2015, 3 pages.

(Continued)

*Primary Examiner* — Shanto Abedin
(74) *Attorney, Agent, or Firm* — The Farrell Law Firm, P.C.

(57) ABSTRACT

A method of a memory device is provided. The method includes generating, by a controller of the memory device, a hashed index by hashing a source index comprising a namespace identification (NSID) and a keytag with a hash function; accessing, by the controller, a first storage address corresponding to the hashed index; comparing, by the controller, a tag portion corresponding to the first storage address with the source index to identify whether a conflict exists; and in response to identifying whether the conflict exists, obtaining, by the controller, information from the first storage address.

20 Claims, 15 Drawing Sheets

(56) References Cited

U.S. PATENT DOCUMENTS

| | | |
|---|---|---|
| 8,555,088 B2 | 10/2013 | Saarinen et al. |
| 8,621,240 B1 | 12/2013 | Auchmoody et al. |
| 8,868,926 B2 | 10/2014 | Hunt et al. |
| 8,880,544 B2 | 11/2014 | Bowden et al. |
| 9,154,442 B2 | 10/2015 | Mital et al. |
| 10,333,846 B2 | 6/2019 | Singhal et al. |
| 10,706,101 B2 | 7/2020 | Breslow et al. |
| 2008/0021908 A1 | 1/2008 | Trask et al. |
| 2009/0282167 A1 | 11/2009 | Dai |
| 2014/0281040 A1* | 9/2014 | Liu .................. G06F 9/50 710/3 |
| 2015/0286639 A1* | 10/2015 | Bordawekar ....... G06F 16/9014 707/747 |
| 2019/0266103 A1* | 8/2019 | Pearson ................ H04L 9/0897 |
| 2019/0294557 A1* | 9/2019 | Dhuse .................. G06F 3/0604 |
| 2019/0384725 A1 | 12/2019 | Lasko et al. |
| 2020/0136971 A1* | 4/2020 | Cohen .................. H04L 9/0833 |
| 2020/0409849 A1* | 12/2020 | Nallan Chakravarthi .................. G06F 12/0815 |
| 2021/0191880 A1 | 6/2021 | Ki |
| 2021/0406241 A1* | 12/2021 | Patel ................. G06F 16/128 |

FOREIGN PATENT DOCUMENTS

| | | |
|---|---|---|
| EP | 0 381 418 | 8/1990 |
| EP | 0 411 691 | 2/1991 |

OTHER PUBLICATIONS

European Search Report dated Jul. 25, 2023 issued in counterpart application No. 23160216.0-1224, 14 pages.

Agrawal, Rakesh et al., "Order Preserving Encryption for Numeric Data", Proceedings of the 2004 ACM SIGMOD International Conference on Management of Data (SIGMOD '04). Association for Computing Machinery, New York, NY, USA, 563-574.

Zhao, Jianing et al., "A method to Avoid Smartphone Memory Errors Impacting Encryption Keys," Proceedings of the 2016 Winter Simulation Conference (WSC), 2016, pp. 1848-1859.

Bösch, Christoph et al., "A Survey of Provably Secure Searchable Encryption", ACM Comput. Surv. 47, 2, Article 18 (Jan. 2015), 51 pages.

* cited by examiner

Add/Delete/Reorder/Traverse#

| # | Method | | Entry # | Add | Del HOL | Reorder MFU | Number of Memory Access Look-Ups Normalized to DRAM.1 | | |
|---|---|---|---|---|---|---|---|---|---|
| | | | | | | | SRAM | DRAM.1 | DRAM.2 |
| FIG. 2 | LL Hash | + Merge RAM | 65,536 | Add to TOL | Delete and Relink | Copy MFU to HOL, LL changes | | 1 | 0.5 |
| FIG. 3 | LL Hash | + Expansion | (4+1)x 65,536 | Add to TOL | Delete and Relink | Copy MFU to HOL, LL changes | | 1 | 0.125 |
| FIG. 4 | LL Hash | + Expansion + Redirect | 65,536 | Add to TOL | Delete and Relink | LL changes | .04 | 1 | 0.125 |
| | | | 4x 65,536 | | | | | | |

Note1: Assume 50% of Hash Conflict at Load_Factor = 1x
Note2: Assume 12.5% of Hash Conflict at Load_Factor = 1/4x
Note3: Normalized SRAM access to DRAM access : 1/25x ~ 1/14x
 - SRAM:2ns-5ns vs DRAM 50ns-70ns

FIG. 5

| # | 5 options to issue Multiple Hash Index Probe | Application Scenario |
|---|---|---|
| FIG. 7 | Sequential issue H1, H2, H3.... Probe mode | DRAM Controller perform Page-miss or Start-of-Row for each read |
| FIG. 8 | Concurrent issue H1, H2, H3, Probe mode | DRAM Controller perform Page-Hit Access back-to-back for 3 read |
| Hybrid 1 | Program Selectable sequential or Concurrent Probe mode | Program Select Either #1 or #2 depending on the DRAMC |
| Hybrid 2 | Dynamic adaptive Sequential and Concurrent mode | Start up with Sequential. If the current probe is conflict, then next probe to Concurrent issue. If the current probe is no-conflict, then next probe is Sequential issue. |
| Hybrid 3 | Progressive Dynamic Adaptive mode | Start up with Sequential, If find Conflict, change next probe to Concurrent issue but with increment number of probe,<br>- from 0 to 1, from 1 to 2, or from 2 to 3.<br>- Saturate at 3(or max concurrent count).<br>If find no-conflict, change next probe to reduce concurrent issue or sequential number of probe,<br>- from 3 to 2, from 2 to 1, or from 1 to 0 (sequential issue). |

FIG. 10

Add/Delete/Reorder/Traverse#

| # | Method | Entry # | Add | Del | Reorder MFU | Table + 1st + 2nd + Traverse # Memory Access | | |
|---|---|---|---|---|---|---|---|---|
| | | | | | | SRAM | DRAM.1 | DRAM.2 |
| FIG. 2 | LL Hash + Merge | 65,536 | Add to TOL | Delete and Relink | Copy MFU to HOL, LL Changes | | 1 | 0.5 |
| FIG. 3 | LL Hash + Expansion | 4x 65,536 | Add to TOL | Delete and Relink | Copy MFU to HOL, LL Changes | | 1 | 0.125 |
| FIG. 4 | LL Hash + Expansion + Redirect | 65,536 4x 65,536 | Add to TOL | Delete and Relink | LL Changes | | 1 | 0.125 |
| FIG. 7 | Double Hash + Sequential | 65,536 | Open Hashed Index | Invalidate Entry | Swap Entry Association | | 1 | 0.5 |
| FIG. 8 | Double Hash + Parallel | 65,536 | Open Hashed Index | Invalidate Entry | Swap Entry Association | .04 | 1 | ~0 |
| FIG. 9 | Double Hash + Expansion + Redirect + Parallel | 65,536 4x 65,536 | Open Hashed Index | Invalidate Redirect Entry | Swap Entry Association | .04 | 1 | ~0 |

Note1: Assume 50% of Hash Conflict at Load_Factor = 1x
Note2: Assume 12.5% of Hash Conflict at Load_Factor = 1/4x
Note3: Normalized SRAM access to DRAM access : 1/25x ~ 1/14x
  - SRAM:2ns-5ns vs DRAM 50ns-70ns

FIG. 11

SYSTEM AND METHOD FOR EFFICIENTLY OBTAINING INFORMATION STORED IN AN ADDRESS SPACE

PRIORITY

This application is based on and claims priority under 35 U.S.C. § 119(e) to U.S. Provisional Patent Application Ser. No. 63/318,534, filed on Mar. 10, 2022, the entire contents of which are incorporated herein by reference.

TECHNICAL AREA

The present disclosure relates generally to memory devices and encryption key systems.

BACKGROUND

Files are a type of data structure that are used by applications to manage user data. As such, efficient processing, storage, security, and general management of the data is important to information technology (IT) systems. Applications use and depend upon file systems, operating systems (OSs), and other such system software for file management and access related operations.

Storage devices (e.g., persistent data storage devices such as solid state drives (SSDs)) for modern IT infrastructure are increasing in popularity, as vast amounts of data are being generated by various applications, such as, for example, Internet of things (IOT), social networks, autonomous vehicles, etc. NAND flash media based SSD storage devices are also components of the IT infrastructure.

When applications require data, the desired data portions of stored files are fetched from a storage device. Since storage devices may provide high performance persistent storage, some system performance bottlenecks have shifted towards system software layers. File read latency of such operations is an important factor in the performance and end-user experience of applications (e.g., gaming and online shopping applications).

SUMMARY

The present disclosure has been made to address at least the disadvantages described above and to provide at least the advantages described below.

According to an aspect of the disclosure, a method of a memory device is provided. The method includes generating, by a controller of the memory device, a hashed index by hashing a source index comprising a namespace identification (NSID) and a keytag with a hash function; accessing, by the controller, a first storage address corresponding to the hashed index; comparing, by the controller, a tag portion corresponding to the first storage address with the source index to identify whether a conflict exists; and in response to identifying whether the conflict exists, obtaining, by the controller, information from the first storage address.

According to another aspect of the disclosure, a system comprises a memory and a controller configured to generate a hashed index by hashing a source index comprising an NSID and a keytag with a hash function; access the first storage address corresponding to the hashed index; compare a tag portion corresponding to the first storage address with the source index to identify whether a conflict exists; and in response to identifying whether the conflict exists, obtain the info oration from the first storage address.

According to another aspect of the disclosure, a storage device comprises a controller and a storage medium. The controller is configured to generate a hashed index by hashing a source index comprising an NSID and a keytag with a hash function; access the first storage address corresponding to the hashed index; compare a tag portion corresponding to the first storage address with the source index to identify whether a conflict exists; and in response to identifying whether the conflict exists, obtain the information from the first storage address.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 5 is a table comparing memory access attributes of the embodiments of FIG. 2, FIG. 3, and FIG. 4 for Add/Delete/Reorder/Traverse commands, according to an embodiment;

FIG. 10 is a table illustrating five multiple hash index probe types and corresponding application scenarios, according to an embodiment;

FIG. 11 is a table comparing memory access attributes of the embodiments of FIG. 2, FIG. 3, FIG. 4, FIG. 7, FIG. 8, and FIG. 9 for Add/Delete/Reorder/Traverse commands, according to an embodiment;

DETAILED DESCRIPTION

Figure 1:
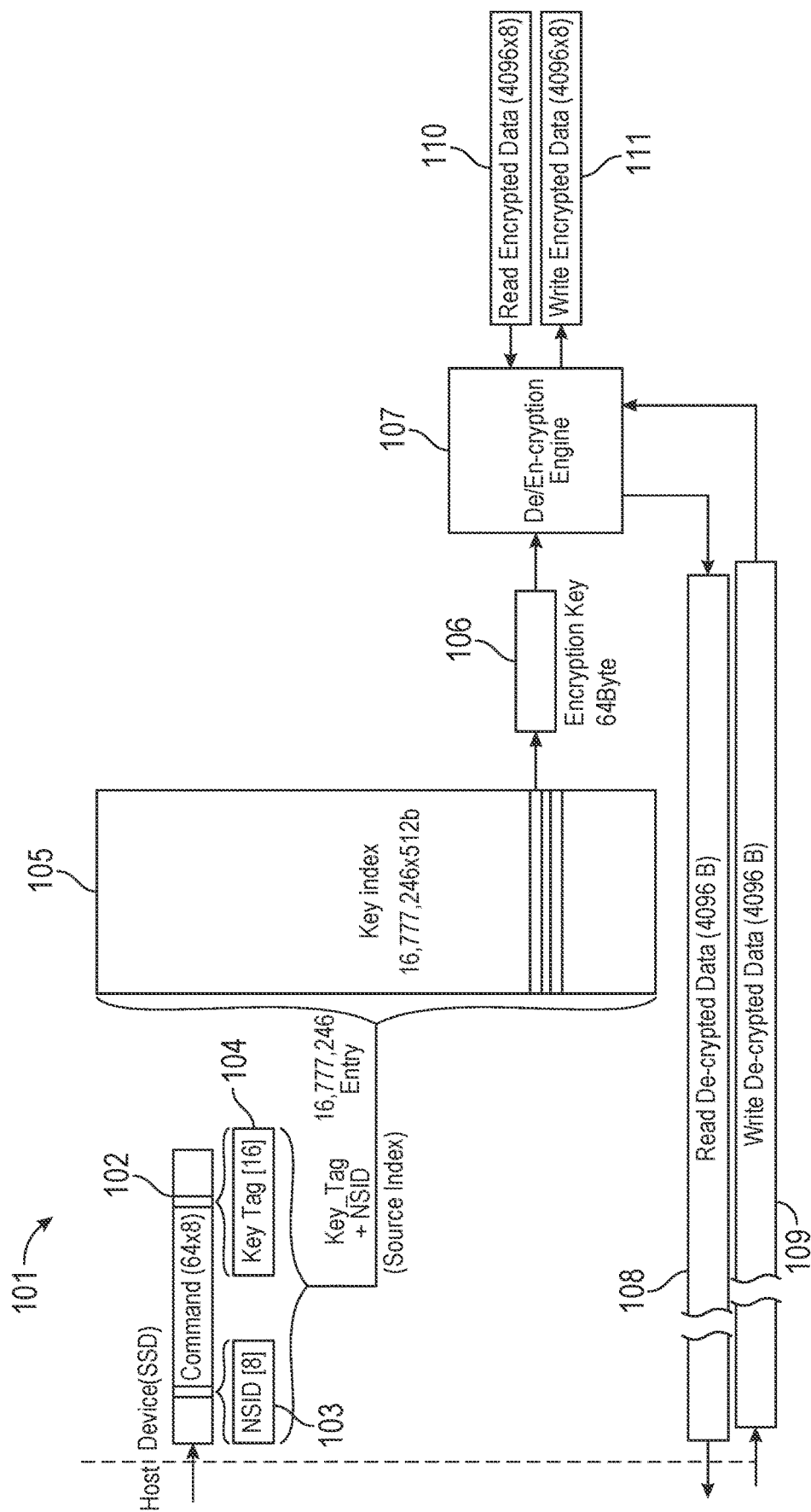
FIG. 1 is a block diagram illustrating a key per input output (KPIO) system, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices utilizing storage devices. The electronic devices may include, for example, a portable communication device (e.g., a smart phone), a computer, a portable multimedia, device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "$2^{nd}$," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, firmware, or combination thereof, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

For secure data storage, user accessible data should be protected, which can require encryption and decryption. A memory storage system may allow a host device to select either an encryption or decryption key for every input/output (IO) corn and, referred to as key per IO (KPIO).

Self-encrypting drives (SED) may perform continuous encryption on user accessible data. This is done at interface speeds using a small number of keys generated/held in persistent media by the storage device. KPIO may utilize a large number-of encryption keys to be managed and securely downloaded into a non-volatile memory subsystem. Encryption of user data may occur on a per command basis (each command may request the use a different key).

In order to efficiently store encrypted data, a hash function may be used. Hash functions take an arbitrarily long string of bytes and produce a shorter fixed size result. For example, a first key type may be input to a hash function to output a shorter fixed size result (e.g., a hash value). A hash value may be an index for a specific element stored in memory. A hash table may be used to store hash values corresponding to the first key type and value pairs in a list that is accessible through its index. The values in the hash table (paired with the hash value of the first key type) may be a second key type used for KPIO. Therefore, when the values in the hash table are the second key type used for KPIO, the values may be used to encrypt/decrypt data to perform read/write commands. Additionally, the values in the hash table (paired with the hash value of the first key type) may be include one or more data objects.

Memory storage systems often require a large number of possible keys for storage but a relatively small fraction of them may be used during memory read/write operations. Thus, memory storage may be inefficient because larger than required memory spaces may be allocated for storing the large number of keys, thereby increasing the cost and power consumption of such designs. In addition, inefficient designs may also causing slow reading and writing of data.

A method to efficiently allocate memory space and lookup information (an encryption or decryption key) in large source address spaces is proposed. The method may expand lookup table size to improve throughput without necessarily increasing memory size. This, in turn, may minimize lookup iterations and enable scaling of encryption key lookup with an SSD input output operations per second (IOPS), which access time of memory is substantially fixed. Accordingly, the present disclosure may provide improved product performance of encryption key processing with minimal costs.

In addition, the present disclosure proposes the storage of keys packed into a smaller-storage space and stored in a unique order. Original-access-indexes may be converted into new-access-indexes to optimize storage space. A hash function access-index conversion method is proposed, which advantageously reduces the cost of storing information. A challenge, however, is to provide a hash conflict resolution solution that provides high access performance while accommodating low memory access time.

FIG. 1 is a block diagram illustrating a key per input output (KPIO) system, according to an embodiment. Throughout FIG. 1, some of the components include a number of bits or bytes corresponding to each component (e.g., Command (64×8) and/or encryption key 64 Byte). The number of bits or bytes corresponding to each component is exemplary and is provided to aid in the understanding of the drawings. In particular, the size of each of the components may be used for illustrative purposes to help understand the physical relationships among components. The actual number of bits, bytes, or entries for each component may vary, depending on the needs of the system.

A KPIO system 101 may be a {key, value} system. The {key, value} system may store data as a collection of key-value pairs in which the key serves as a unique identifier to the value. The value may be made up of a fixed number of bits (e.g., 512 bits) and may represent a security key (e.g., a private key) for encrypting or decrypting data (Note, the key included in the "{key, value}" pair may be a different type of key than the security key included in the "value" field.). An Advanced Encryption Standard (AES) decryption key may be stored in volatile read only memory, such as a dynamic read only memory (DRAM). The value representative of the security key (e.g., the 512 bit security key) may be addressed by namespace identifiers (NSID)+ key tag.

Referring to FIG. 1, a host may transmit a read or write command 102 to a storage device (e.g., an SSD (e.g., a flash drive)). The command 102 may include an NSID+ key tag. The NSID 103 may identify a memory to read to or write from. The NSID 103 may be made up of 8 or more bits. The key tag 104 may be a key index used to index an encrypting/decrypting key for a specific NSID. The system may be composed of more than one NSID and keytags in different NSIDs can overlap. The NSID 103 and the key tag 104 may be combined to form data structure 105 (e.g., a key index, a non-overlapping {key, value} index, an encryption index, a decryption key index, a lookup table, or an array). The data structure 105 may be an AES index. The size of the data structure 105 may be composed of 16,777,246 (entries)×512 bits, and may be used to retrieve a security key 106 (e.g., an AES encryption key or encryption key). The security key 106 may be 64 bytes (512 bits).

In this regard, the data structure 105 is large. The data structure 105 includes about 16 million possible entries. However, the system may use 64 thousand valid entries. Thus, the total memory size may be 1 gigabyte (GB), and the total valid memory size may be 4 megabytes (MB). Since the number of valid entries is small relative to the total size of the memory, the memory is sparse. Having a pre-defined fixed/max number of valid keys (e.g., 64 thousand) is a characteristic of KPIO encryption that that uses a limited memory size and a maximum number of lookups in the large and sparse source address space, thereby increasing the importance of relying on an efficient throughput calculation for quickly finding and retrieving valid keys.

A security key 106 may be retrieved and sent to the de/encryption engine 107. Decrypted data (e.g., unencrypted data) may be read 108 or decrypted data may be written 109 from the host to the SSD, and the security key 106 may be used by the de/encryption engine 107 to read encrypted data 110 or write encrypted data 111. The encrypted data 110 or 111 may be 4,096×8 bits and stored in memflash. For example, the encrypted data 110 or ill may be stored in a remote server (e.g., a cloud server).

A direct address lookup table (LUT) may be used to store key values in the key index 105 in a KPIO system. A direct address LUT addresses each command 102 to a specific address space in the key index 105, however the size of the AES encryption key index 105 must be very large, since a fixed portion of the size of the key index 105 can include valid entries.

Using a content addressable memory (CAM) lookup may be a solution for efficiently obtaining or retrieving key values in a KPIO system. Advantageously, CAM lookup reduces memory storage size of the key index 105 and achieves a fast throughput. Unfortunately, CAM uses a large number of logic gates to enter or retrieve key values, which is expensive. For example, for 64 thousand valid entries, 64 thousand×24 bit comparators may be needed to perform logic functions to redirect a source index to a valid key address space in the key index 105.

Additionally, hash addressing can be used to hash the source index command to a finite size to identify a key storage address of a hash key index (e.g., reducing the index command from 24 to 16 bits). Hash addressing advantageously reduces the memory size of a memory by using a hash key index, since hashed indexes can be stored compactly with a reduced length. Unfortunately, since multiple source keys (e.g., keys from one or more sources to be input into the hash function) may be linked to a single hash index, retrieval of a valid value from the same hash index-may require a conflict resolution operation which may slow throughput.

The hash conflict resolution operation may involve performing a compare operation when using hash indexes to identify storage indexes in a primary memory. If the compare operation matches a hashed index corresponding to an storage address in the primary memory with a source index (e.g., an NSID+key tag), then a link list may be used to designate a secondary memory address space to associate the hashed index corresponding to the storage address in the primary memory with the source index. In this manner, multiple entries can be associated with the same hashed index using the link list. Accordingly, the size of the primary memory may be reduced to a small size, since only valid entries may be included. However, when a conflict occurs and a link list is designated, the size of the memory must be expanded and designated as a second memory. In addition, due to the compare operation, a conflict may occur and accessing the memory may require multiple operations to obtain data from link lists.

A peripheral component interconnect express (PCIe) link may be used to access memory. The PCIe4×4 standard may use 2 million (M) IOPS or 500 nanoseconds (ns) for one lookup (e.g., read or write). The PCTe4×6 standard may use 8 M TOPS or 125 ns for one lookup. DRAM access may be about 50-70 ns. Thus, using the PCIe4×6 standard, only 1-2 lookups can be performed per command, which presents a significant improvement in lookup speed.

Accordingly, the present application proposes solutions that efficiently store keys a key value index (e.g., by improving a ratio of storing more valid key entries per total memory size) using a small number of logic gates. Also, the solutions proposed by the present application are capable of performing fast throughput that minimize the number of lookups for accessing a key index stored in DRAM.

Additionally, reducing the latency from the time of accessing the SSD from the host device and composing a key (e.g., from command 102 of FIG. 1) to the time of identifying a valid encryption key (e.g., to identifying security key 106 in FIG. 1) should ideally be reduced and/or minimized. The solutions presented in the present application achieve this.

In addition, {key, value} pairs stored in a memory index (e.g., key index 105 of FIG. 1) may be stored to efficiently allow for adjustments, such as add, insertion, delete, and/or reorder lookup order of a {key, value} pair so as to minimize a number of operations.

Figure 2:
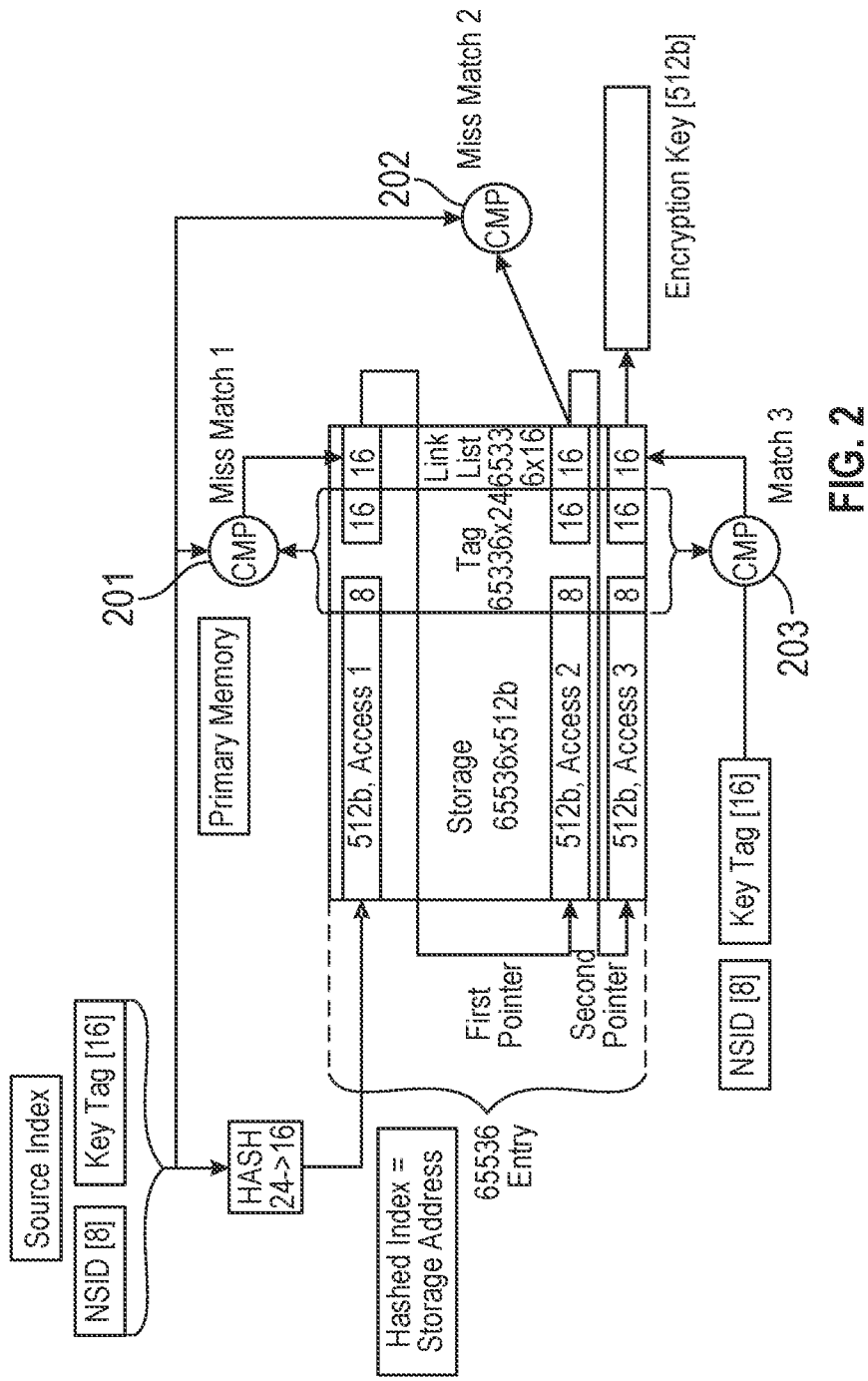
FIG. 2 is a block diagram illustrating hash conflict resolution, according to an embodiment.

FIG. 2 is a block diagram illustrating hash conflict resolution, according to an embodiment. Throughout FIG. 2, some of the components include a number of bits or bytes corresponding to each component (e.g., NSID [8] and/or Tag 65336 (entries)×24 bits). The number of bits or bytes corresponding to each component is exemplary and is provided to aid in the understanding of the drawings. In particular, the size of each of the components may be used for illustrative purposes to help understand the physical relationships among components. The actual number of bits, bytes, or entries for each component may vary, depending on the needs of the system.

Hash conflict resolution using a link list may merge separate chaining link lists with a hash table to save memory space for unused slots in a primary memory. Hash conflict resolution may be applied to a KPIO system, such that a source index (an NSID and key tag) is hashed and used to identify a storage address corresponding to an encryption or decryption key stored in DRAM, as described below in FIG. 2.

The operations described in FIG. 2 may be performed by a controller stored in memory, a processor, or computer-implemented instructions.

Referring to FIG. 2, a source index comprising an NSID and key tag may be hashed from 24 to 16 bits to generate a hashed index. The hashed index represents a storage address of the primary memory a hash table). At step 201, a tag portion of access 1 is compared (e.g., by a controller) to the hashed index of the NSID and key tag representing the storage address of the primary memory. The tag portion of access 1 may represent a local address of the access 1 in DRAM entry and is compared with the source index comprising the NSID and key tag.

As shown in FIG. 2, it is determined by the comparison at step 201 that a conflict exists (miss match 1). Accordingly, a first pointer is assigned to link access 1 to another storage address in the primary memory (DRAM), access 2.

At step 202, a tag portion of the storage address, access 2, is compared to the NSID and key tag. As shown in FIG. 2, the comparison at step 202 determines that another conflict exists (miss match 2), and a second pointer is assigned to link access 2 to another storage address in the primary memory (DRAM), access 3.

At step 203, a tag portion of the storage address, access 3, is compared to the NSID and key tag. As shown in FIG. 2, the comparison at step 203 determines that a conflict does not exist (match 3), and the encryption key may be accessed.

The "folding" operation (e.g., creating linked list to a hash index within the same memory) of FIG. 2 may be performed when a conflict occurs when a hashed index stored in the primary memory is matched with a source index (e.g., NSID+key tag). If a conflict occurs, then multiple memory spaces in the primary memory are configured to the same hash index.

There are three types of entries that can be stored in the primary memory: a head of list (HOL) entry, an empty entry, and an occupied second plus entry. The HOL entry is the first storage address associated with a hashed index (e.g., the start of a link list). The empty entry is a storage address that is not associated with a hashed index and is otherwise unused. The occupied second plus entry is a storage address associated with a hash index that is already associated with another storage address (e.g., a second or third entry associated with the same hash index).

As described above, the link list function of the secondary memory is "folded" into the primary memory, thereby reducing the total size of the memory. However, if an entry is added that conflicts with an occupied link list entry (e.g., an occupied second link list entry), the occupied link list will need to be reconfigured, and therefore the adding, inserting, and deleting operations may cause accessing the memory to be slowed. When reconfiguring a link list chain, the adding, inserting, and deleting operations may cause the primary memory to be in flux, which limits its accessibility and causes downtime. Therefore, reducing the likelihood of a conflict occurring is desirable. When adding or inserting an entry that conflicts with the HOL, no reconfiguration is required, since the entry may be assigned to an empty address that can be linked as the tail of line (TOL) of the link list.

Figure 3:
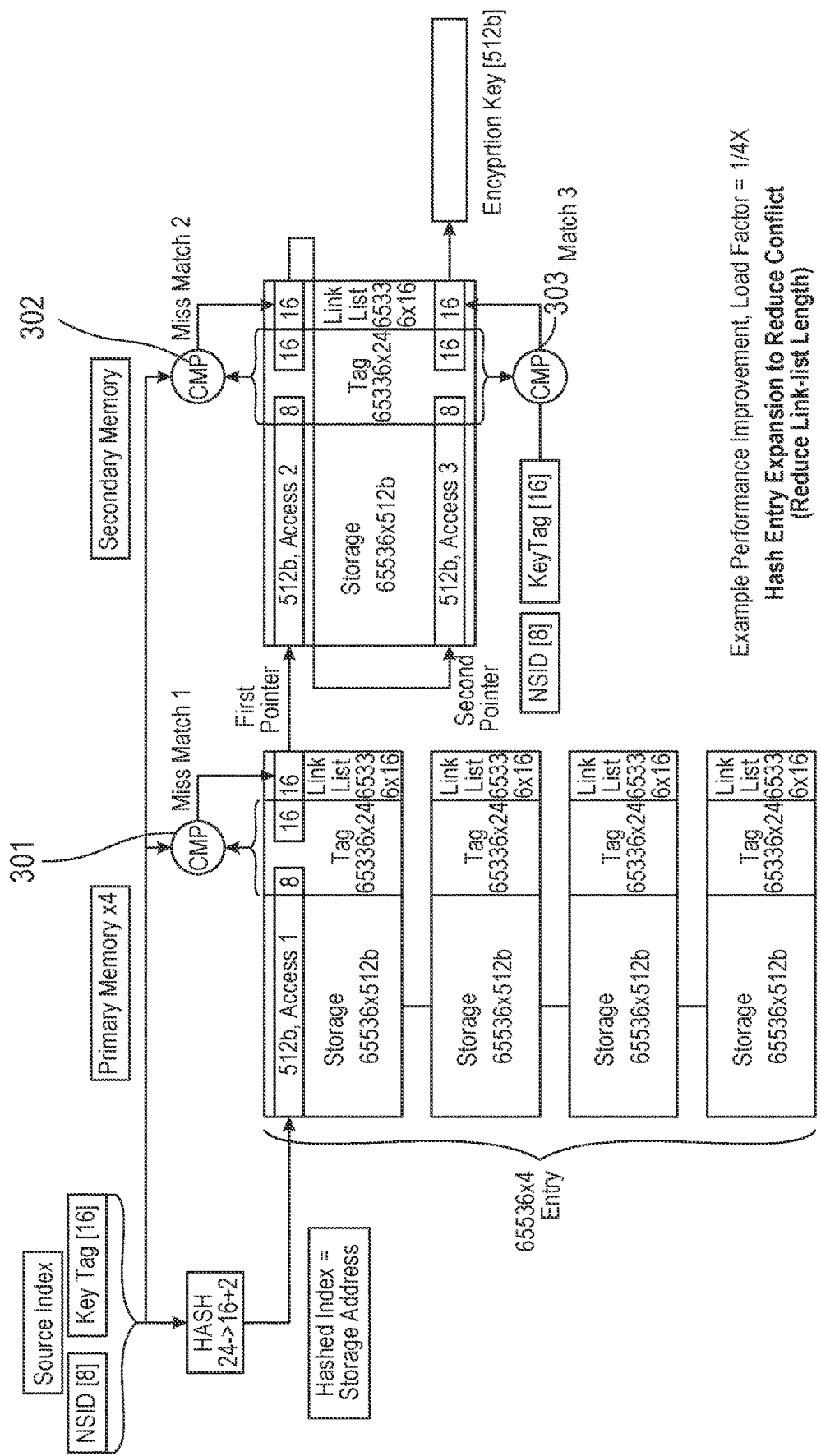
FIG. 3 is a block diagram illustrating hash entry expansion to reduce the likelihood of a conflict occurring, according to an embodiment.

FIG. 3 is a block diagram illustrating hash entry expansion to reduce the likelihood of a conflict occurring, according to an embodiment. Throughout FIG. 3, some of the components include a number of bits or bytes corresponding to each component (e.g., NSID [8]) and/or encryption key 512*b*). The number of bits or bytes corresponding to each component is exemplary and is provided to aid in the understanding of the drawings. In particular, the size of each of the components may be used for illustrative purposes to help understand the physical relationships among components. The actual number of bits or bytes for each component may vary, depending on the needs of the system.

The operations described in FIG. 3 may be performed by a controller stored in memory, a processor, or computer-implemented instructions.

Referring to FIG. 3, an entry comprising an NSID and key tag may be hashed from 24 to 18 bits to generate a hashed index. In this case, the hash function has 18 bits, which is 2 more bits than the hash function presented in the embodiment provided in FIG. 2. In addition, the primary memory in FIG. 3 is expanded four times, as compared to the embodiment provided in FIG. 2. Additionally a secondary memory is also provided. As described below, increasing the hash function by 2 bits and increasing the primary memory by a factor of four reduces the possibility of a conflict occurring by ¼.

The hashed index represents a storage address of the primary memory (e.g., a hash table). At step 301, a tag portion of access 1 is compared to the NSID and key tag. The tag portion of access 1 may represent a local address of the access 1 entry and is compared with the source index comprising the NSID and key tag.

As shown in FIG. 3, it is determined, by the comparison at step 301 that a conflict exists (miss match 1). Accordingly, a first pointer is assigned to link access 1 to another storage address in the secondary memory, access 2.

Since the primary memory is expanded by a factor of four, the utilization of the memory is thus reduced by ¼, thereby reducing the load factor by ¼ and reducing the chances of a conflict occurring.

In addition, in step 302, a tag portion of the storage address, access 2, is compared to the NSID and key tag. The comparison at step 302 determines that another conflict exists (miss match 2), and a second pointer is assigned to link access 2 to another storage address in the secondary memory, access 3.

In step 303, a tag portion of the storage address, access 3, is compared to the NSID and key tag. As shown in FIG. 2, the comparison at step 303 determines that a conflict does not exist (match 3), and the encryption key may be accessed.

Figure 4:
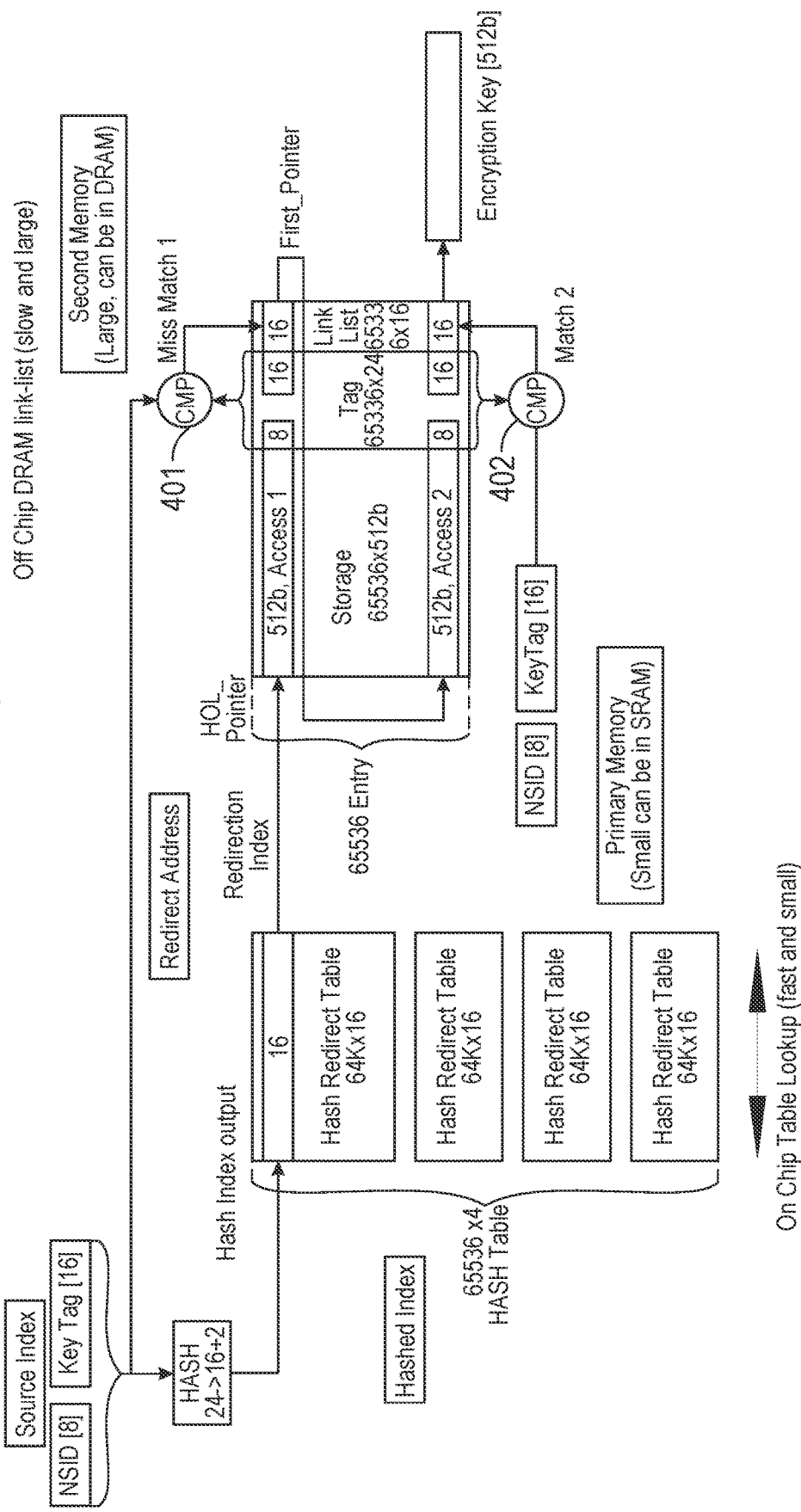
FIG. 4 is a block diagram illustrating a redirection table to request entry, according to an embodiment.

FIG. 4 is a block diagram illustrating a redirection table to request entry, according to an embodiment. Throughout FIG. 4, some of the components include a number of bits or bytes corresponding to each component (e.g., NSID [8]) and/or encryption key 512*b*). The number of bits or bytes corresponding to each component is exemplary and is provided to aid in the understanding of the drawings. In particular, the size of each of the components may be used for illustrative purposes to help understand the physical relationships among components. The actual number of bits or bytes for each component may vary, depending on the needs of the system.

The operations described in FIG. 4 may be performed by a controller stored in memory, a processor, or computer-implemented instructions.

Referring to FIG. 4, the primary memory is composed of a 65536×4 bit hashed index redirection table (hash redirect table), which significantly reduces the size of the primary memory because the storage (e.g., which stores the encryption/decryption key) and tag components of the entries are not stored on the primary memory. In this case, the primary memory may be composed of static read only memory (SRAM), and be located on an IC (e.g., an ASIC) having read/write speeds that are faster than accessing a DRAM. The DRAM may be located off of the integrated circuit (IC) chip and may be large relative to the size of the SRAM. Thus, the hash redirect table may be referred to as an "on chip" hash redirect table that may quickly be accessed to obtain a redirect address.

The hash redirect table is a redirection index that redirects to an address of the secondary memory (e.g., DRAM). The hash redirect table is configured so that an entry of the hash redirect table points to a corresponding first entry in the secondary memory (including a corresponding AES storage and tag). The input to the hash redirect table may be 18 bits, and the output is 16 bits.

Since the AES storage component and the tag component of each entry are stored in the secondary memory instead of the primary memory in this configuration, the size of the information stored in the primary memory (e.g., the hash redirection table) is reduced.

Accordingly, when the hash redirection table is used, the controller (e.g., the processor) identifies a redirection index using the 18-bit hashed source index to point to the first entry of a corresponding entry in the secondary memory (e.g., using an HOL pointer). As shown in FIG. 4, at step 401, a tag portion of access 1 is compared to the NSID and key tag and pointed to by the HOL pointer. The tag portion of access 1 may represent the local address of the access 1 entry (e.g., the memory address of the access 1 entry in DRAM) and is compared with the source index comprising the NSID and key tag.

As shown in FIG. 4, it is determined by the comparison at step 401 that a conflict exists (miss match 1). Accordingly, a first pointer is assigned to link access 1 to another entry in the secondary memory, access 2.

In step 402, a tag portion of the storage address, access 2, is compared to the NSID and key tag. As shown in FIG. 4, the comparison at step 402 determines that a conflict does not exist (match 2), and the encryption key (or decryption key) may be accessed.

The process of accessing a memory address may be called performing a "hop" or "jump". Each time a compare function (e.g., step 401 and step 402) is used, a hop or jump is performed. Therefore, because the hash redirect table is used to quickly identify a HOL pointer to a corresponding entry in the secondary storage, the encryption (or decryption) key may be obtained by quickly accessing a redirection index via the on-chip hash redirect table, and subsequently accessing two entries (two hops), thereby reducing the memory, access time.

As stated above, the present disclosure provides a configuration that may reduce the number of hops necessary to access data. Since the PCIe4×6 standard may use 8 M IOPS or 125 ns for one lookup, reducing the number of hops improves the throughput time for accessing an AES encryption key, which improves overall processing time.

The number of hops (e.g., jumps) is closely correlated with the number of conflicts encountered for performing a look-up. That is, each conflict may result in a hop being performed. Further, depending on the memory type (e.g., DRAM vs. SRAM), each hop may take a different amount of time (e.g., a typical KPIO operation should be performed in 125 ns or less, and if DRAM access is 50-70 ns, then 2 or fewer jumps may be necessary to perform a KPIO lookup).

In addition, as described in the example provided above, the input to the hash redirect table is 18 bits because 2 additional bits were added to hashed index. 16 to 18 bit expansion may reduce the possibility of a conflict by ¼. Also, 1 bit expansion can be used such that the hashed index is expanded from 16 to 17 bits, which may reduce the possibility of a conflict by ½. Also, non-integer bit width expansion is possible, (e.g., expanding 16 bit hashed index of 64 k entries to 16.5 bit hashed index of 198 k entries) that may reduce the possibility of conflict by ⅓.

Other hashed index expansion sizes are possible. For example, the hashed index may be 8 bits and expanded by 2 additional bits to reduce the possibility of a conflict by ¼. In practice, any number of bits can be used, so long as additional bits may be expanded to use a hash redirect table to reduce the possibility of a conflict. Increasing the size of the hashed index may be advantageously used to reduce the possibility of a conflict from occurring during a lookup.

Although hashed index expansion reduces the likelihood of a conflict from occurring during a lookup, expanding the memory size is necessary to accommodate the larger number of bits of the hashed index. However, the benefit of the relatively small expansion of the memory (e.g., from 16 bit length to 18 bit length) is that the likelihood of a conflict occurring is reduced by ¼, which is very valuable for performing KPIO lookups in 2 jumps or less (e.g., for PCIE-G6×4, when memory can be accessed in 125 ns or less).

Also, in the example described above, the redirection table is only expanded 2 bits in length and, notably, does not include the contents of the entry (key value), which would cause the memory expansion size to be much larger.

FIG. 5 is a table comparing memory access attributes of the embodiments of FIG. 2, FIG. 3, and FIG. 4 for Add/Delete/Reorder/Traverse commands, according to an embodiment. For convenience of description, the embodiments described in FIGS. 2-4 may be referred to as "chaining hash" embodiments.

SRAM is relatively faster than other RAM types, such as DRAM. It also consumes less power. DRAM is a type of RAM which allows you to stores each bit of data in a separate capacitor within a particular IC. Therefore, SRAM has lower access time, and is faster whereas DRAM has a higher access time and is slower compared to SRAM. SRAM may be in the form of on-chip memory, but DRAM has the characteristics of off-chip memory. DRAM.1 may refer to a first memory, address of DRAM and DRAM.2 may refer to a second memory address of DRAM.

Referring to FIG. 5, considering the merge RAM method (e.g., FIG. 2), in order to obtain an encryption key, DRAM.1 is accessed, and there is a 50% chance of a conflict. Therefore, the average memory access time for performing two jumps is 1.5×(1×+0.5×).

The entry size of the RAM method may be 65,536 (64B+2B+3B).

Considering the memory expansion method (e.g., FIG. 3), in order to obtain an encryption key, DRAM.1 is accessed, and there is a 12.5% chance of a conflict since the primary memory is expanded by a factor of four. Therefore, the average memory access time for performing two jumps may be 1.125×(1×+0.125×).

The entry size of the expansion method may be (4+1)× 65,536 (64B+2B+3B).

Considering the memory expansion and redirect method (e.g., FIG. 4), in order to obtain an encryption or decryption key, SRAM is accessed. A first hop is performed when accessing the SRAM. Access to the SRAM is very fast compared to the DRAM. For example, SRAM access time may take 2 ns-5 ns and DRAM may take 50 ns-70 ns. A normalized SRAM value is assumed to be 0.04× of DRAM. However, faster access times to SRAM are possible. A second and third hop are performed when accessing DRAM.1 and DRAM.2. Therefore, the average memory access time for performing a one redirection hop and two DRAM hops may be 1.165×.

The entry size of the memory expansion and redirect method may be 65,536 (64B+2B+3B) (for the expansion portion (e.g., secondary memory))+4×65,536 (2B) (for the redirect portion (e.g., primary memory)).

For each of the methods described by FIGS. 2-4, the adding and deleting HOL operations include adding to a tail of line (TOL) and deleting and relinking a link list, respectively.

The MFU entry will now be described. If there are three entries in AES storage, and one of the entries has been used more frequently than the other entries, then it may be advantageous to minimize subsequent look-up times, to reorder the entries so that the MFU entry is ordered ahead of the others as the HOL (e.g., the MFU entry should be access 1 instead of access 2 or access 3).

For the merge RAM method and the expansion method, reordering the MFU to the HOL requires copying the MFU entry to the HOL and changing the order of the entries in the linked list. For the expansion and redirect method, reordering the MFU to the HOE, may be accomplished more quickly by using a ring link list, as described below.

Figure 6:
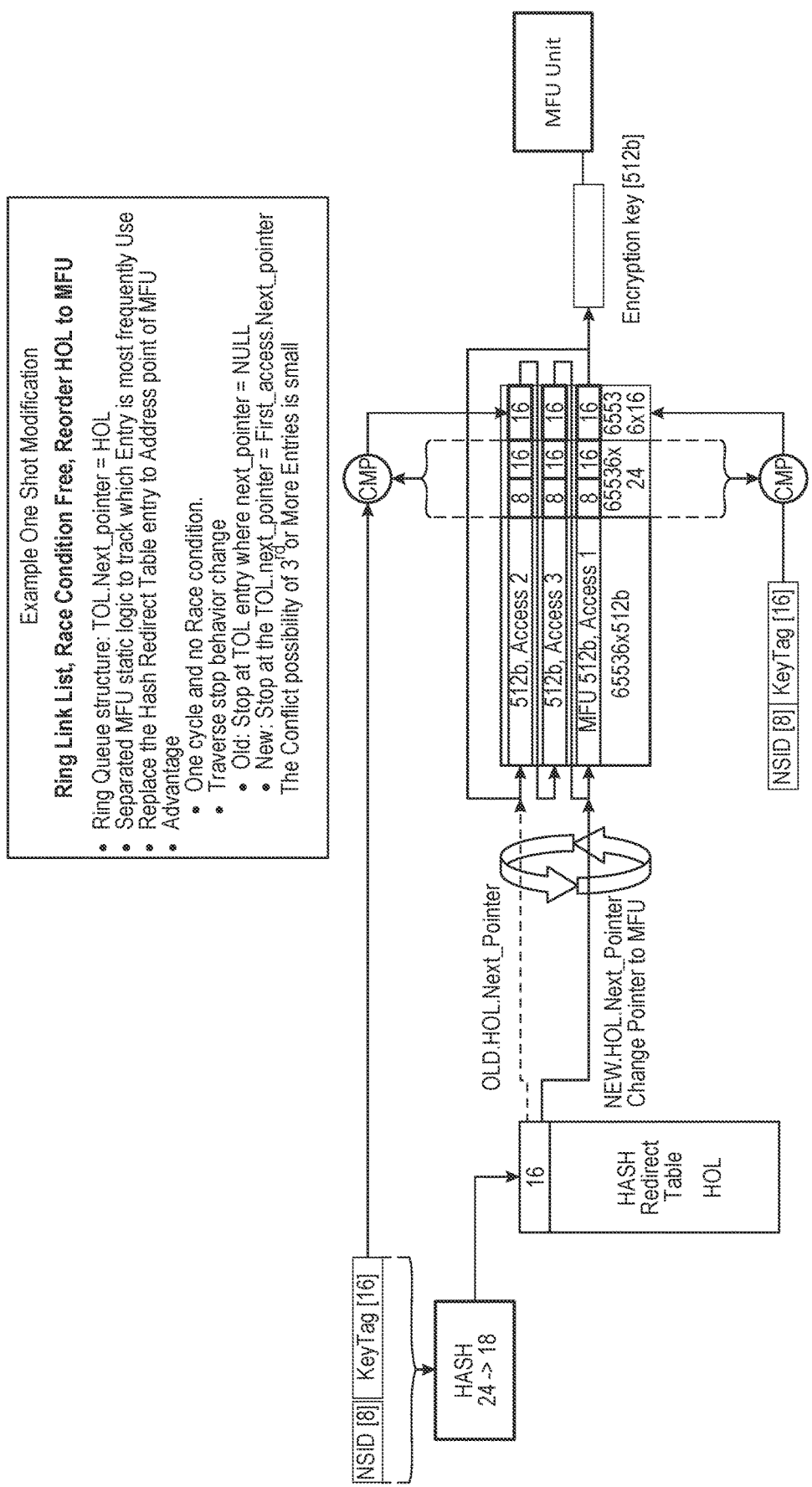
FIG. 6 is a block diagram illustrating a ring link list for efficiently reordering a head of line (HOL) to a most frequently used (MFU) entry, according to an embodiment.

FIG. 6 is a block diagram illustrating a ring link list for efficiently reordering a head of line (HOF) to an MFU entry, according to an embodiment. Throughout FIG. 6, some of the components include a number of bits or bytes corresponding to each component (e.g., NSID [8]) and/or encryption key 512$b$). The number of bits or bytes corresponding to each component is exemplary and is provided to aid in the understanding of the drawings. In particular, the size of each of the components may be used for illustrative purposes to help understand the physical relationships among components. The actual number of bits or bytes for each component may vary, depending on the needs of the system.

The operations described in FIG. 6 may be performed by a controller stored in memory, a processor, or computer-implemented instructions. For instance, instructions performed by the controller may be implemented using as a field programmable gate array (FPGA), an application specific integrated circuit (ASIC), a general purpose computer, or by a remote processing system (e.g., a cloud computing system).

The embodiment illustrated in FIG. 6 is similar to the embodiment of FIG. 4, but additionally includes a ring link list capable of rotating the HOL to the MFU entry of a link list. The link list may be a closed link list so that the last entry points to the HOL.

Referring to FIG. 6, a ring linked list is used to identify the MFU entry to change the pointer of the address identified by the hash redirect table to the MFU entry of the link list (e.g., NEW.HOL.Next_Pointer is changed to MFU). Using the ring linked list greatly reduces the possibility of a conflict because the MFU entry is the most likely entry of the link list that will be accessed. Thus, using the MFU entry reduces the time required to obtain an encryption or decryption key.

An MFU unit may be used to count a number of times an entry in a link list is accessed. For example, the MFU unit may count, on a rolling basis (sliding window), the last 16 lookups to determine the MFU entry. In addition, the MFU may generate a histogram for each link list and a count (Bin) for each entry (e.g., 16 or 32 of the last accesses in each Bin). The information obtained by the MFU unit may be stored and/or sorted using the hash redirect table. That is, the information obtained by the MFU may be stored and/or sorted in DRAM or SRAM.

Using the ring list to point the HOL to the MFU entry of a linked list advantageously does not require a read/write operation, doesn't change the link-list order, and therefore does not necessitate a disruption in the form of accessing the AES storage. Therefore, a benefit achieved by using a ring list may be that a possibility of a conflict being reduced, thereby generating a faster method for quickly obtaining encryption keys from the AES storage.

Figure 7:
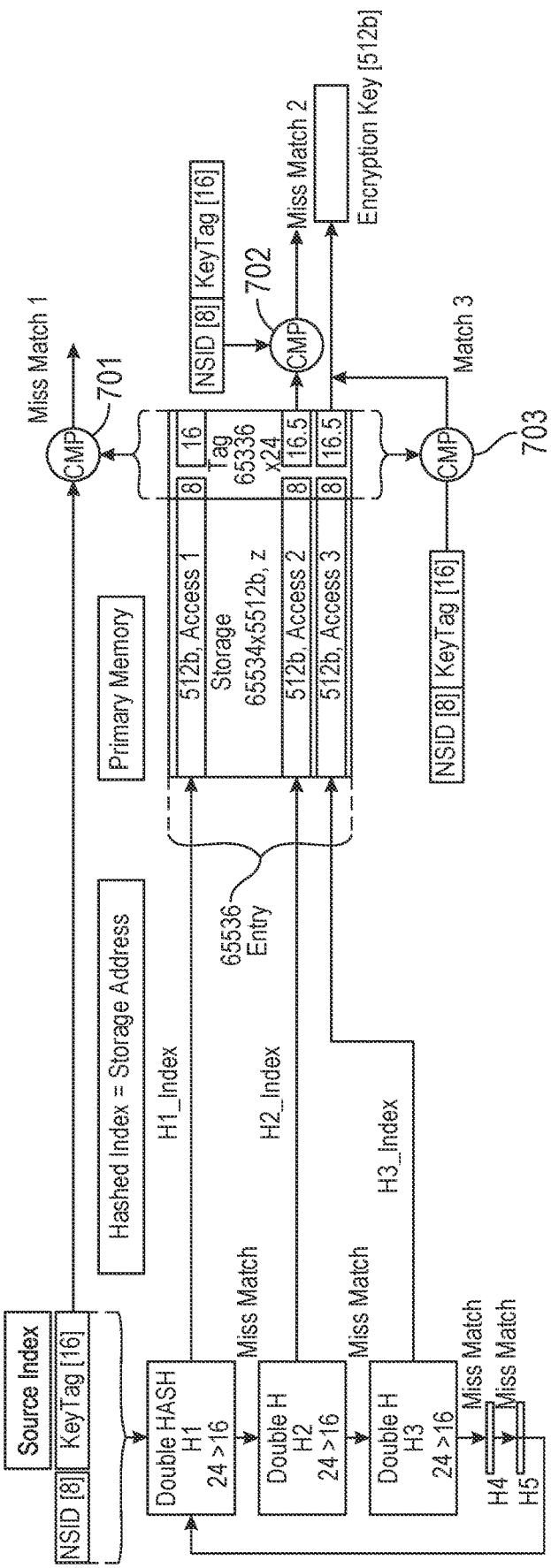
FIG. 7 is a block diagram illustrating a double hash mechanism, according to an embodiment.

FIG. 7 is a block diagram illustrating a double hash mechanism, according to an embodiment. Throughout FIG. 7, some of the components include a number of bits or bytes corresponding to each component (e.g., NSID [8]) and/or encryption key 512$b$). The number of bits or bytes corresponding to each component is exemplary and is provided to aid in the understanding of the drawings. In particular, the size of each of the components may be used for illustrative purposes to help understand the physical relationships among components. The actual number of bits or bytes for each component may vary, depending on the needs of the system.

The operations described in FIG. 7 may be performed by a controller stored in memory, a processor, or computer-implemented instructions.

Referring to FIG. 7, the double hash mechanism may be capable of resolving one or more conflicts and accessing an AES encryption key without using a link list. The double hash mechanism may be applied to a KPIO system.

The double hash mechanism may employ two or more hash functions. In FIG. 7, hash values H1, H2, H3, H4, and H5 are shown. Each hash value may be a combination of two baseline hash functions (e.g., H(K) and H'(K)), and each hash value may generate separated and non-correlated hash indexes corresponding to five randomly allocated addresses in the primary memory.

A source NSID and key tag index may be hashed using the double hash value H1 from 24 to 16 bits to generate a hashed index H1_index that corresponds to a storage address in the primary memory (e.g., a storage address corresponding to access 1). In step 701, the system compares the tag portion of access 1 to the source NSID and key tag index. As shown in FIG. 7, the tag portion of access 1 is determined to conflict with the NSID and key tag pair (miss match 1). When the conflict is determined in step 701, the system hashes the source NSID and key tag index with a second hash value H2 to generate a hashed H2_index that corresponds to a storage address in the primary memory (e.g., a storage address corresponding to access 2). Since H2 is a different hash value than H1, the storage address indicated by the hashed index will result in a different location. In step 702, the system compares the tag portion of access 2 to the source NSID and key tag index. As shown in FIG. 7, the tag portion of access 2 is determined to conflict with the NSID and key tag pair (miss match 2). When the conflict is determined in step 702, the system hashes the source NSID and key tag index with a third hash value H3 to generate a hashed H3_index that corresponds to a different storage address in the primary memory. In step 703, the system compares the tag portion of access 3 to the source NSID and key tag index and, as shown in FIG. 7, the comparison determines that the storage address corresponds to the encryption key (match 3).

With respect to FIGS. 2-6, a link list identified through the memory is used to resolve a conflict. As described above with respect to FIG. 7, a double hash function is used to resolve a conflict. In addition, for the double hash function of FIG. 7, each storage address in the primary memory is a HOL (since none are included in a link list).

Figure 8:
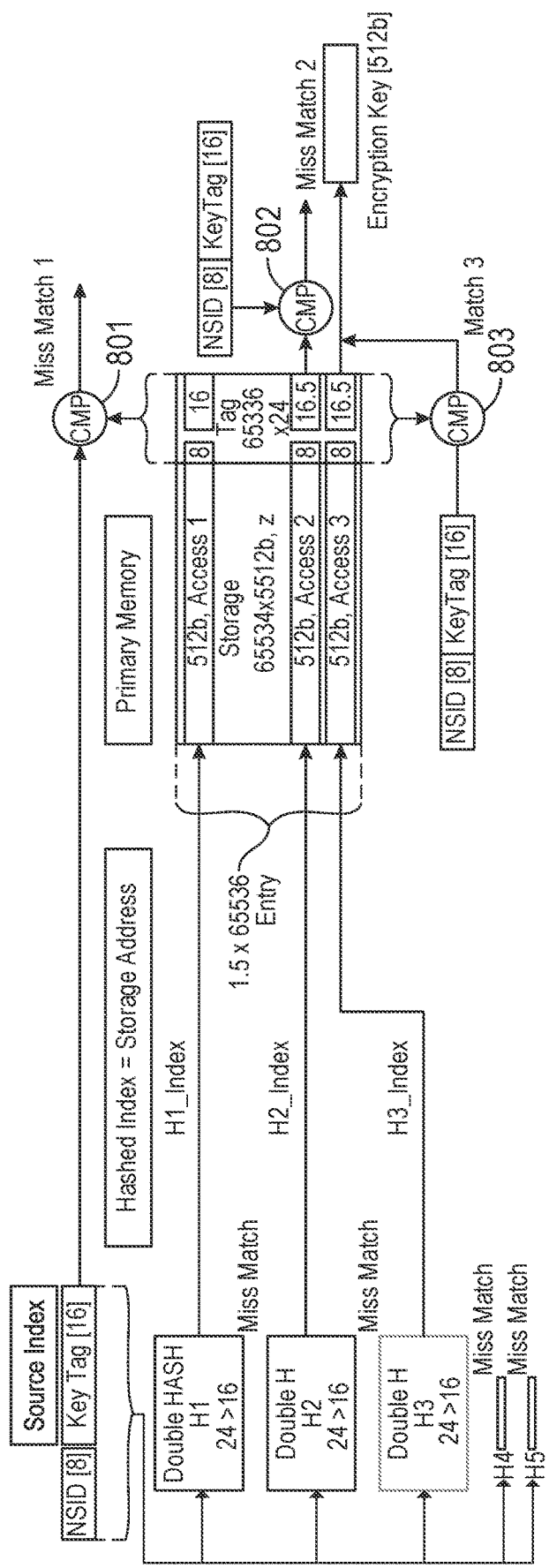
FIG. 8 is a block diagram illustrating a double hash mechanism using a concurrent multiple hash probe, according to an embodiment.

FIG. 8 is a block diagram illustrating a double hash mechanism using a concurrent multiple hash probe, according to an embodiment. Throughout FIG. 8, some of the components include a number of bits or bytes corresponding to each component (e.g., NSID [8]) and/or encryption key 512b). The number of bits or bytes corresponding to each component is exemplary and is provided to aid in the understanding of the drawings. In particular, the size of each of the components may be used for illustrative purposes to help understand the physical relationships among components. The actual number of bits or bytes for each component may vary, depending on the needs of the system.

The operations described in FIG. 8 may be performed by a controller stored in memory, a processor, or computer-implemented instructions.

Referring to FIG. 8, the concurrent multiple hash probe double hash mechanism of FIG. 8 is based on the double hash mechanism of FIG. 7, but additionally applies concurrent hashing of the source index. In particular, when an NSID+keytag source index is hashed, rather than first hashing using the first hash function H1 and, if there is a conflict hashing using the second hash function H2, the concurrent multiple hash probe hashes the NSID+keytag source index using the hash function H1 and the hash function H2 concurrently.

That is, as shown in FIG. 8, the NSID+keytag source index is concurrently hashed using hash functions H1, H2, H3, H4, and H5, resulting in H1_index, H2_index, and H3_index, H4_index, and H5_index respectively being output concurrently. The H1_index, H2_index, and H3_index, H4_index, and H5_index are used to concurrently identify and access storage addresses in the storage (AES storage addresses corresponding to access 1, access 2, and access 3, access 4, and access 5). The tag local indexes corresponding to access 1, access 2, and access 3 are concurrently accessed and concurrently compared in steps 801, 802, and 803 with the NSID+keytag source index to determine a match to output an AES encryption key corresponding to the address in primary memory for which a match is found.

Thus, steps 801, 802, and 803 are similar to steps 701, 702, and 703 in FIG. 7, with the difference being that the comparisons performed in steps 801, 802, and 803 are simultaneously performed.

Figure 9:
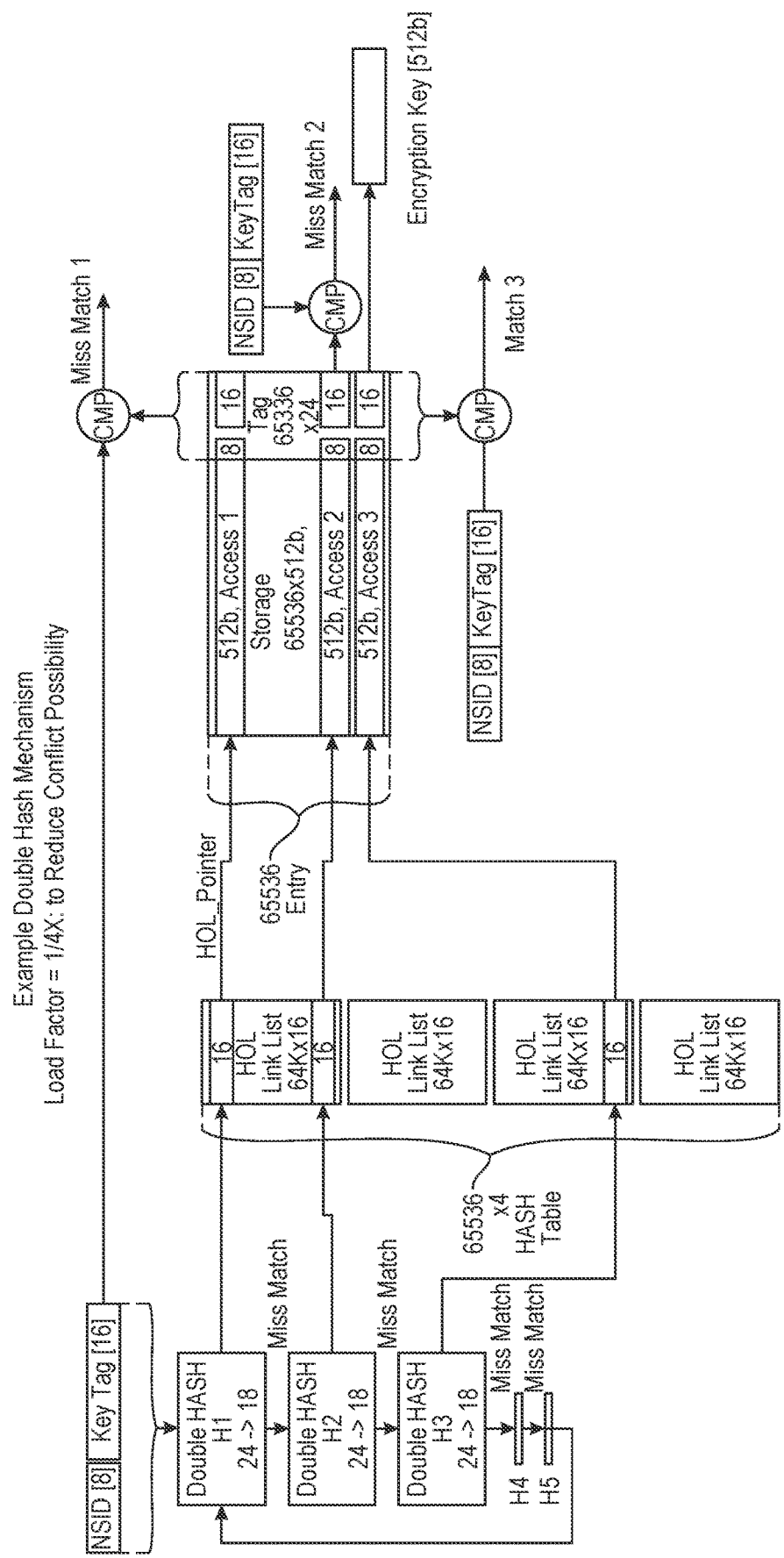
FIG. 9 is a block diagram illustrating a double hash mechanism capable of reducing a conflict possibility, according to an embodiment.

FIG. 9 is a block diagram illustrating a double hash mechanism capable of reducing a conflict possibility, according to an embodiment. Throughout FIG. 9, some of the components include a number of bits or bytes corresponding to each component (e.g., NSID [8]) and/or encryption key 512b). The number of bits or bytes corresponding to each component is exemplary and is provided to aid in the understanding of the drawings. In particular, the size of each of the components may be used for illustrative purposes to help understand the physical relationships among components. The actual number of bits or bytes for each component may vary, depending on the needs of the system.

The operations described in FIG. 9 may be performed by a controller stored in memory, a processor, or computer-implemented instructions.

The configuration proposed in FIG. 9 reduces the likelihood that a conflict will occur and thereby minimizes the average number of double hash functions that are necessary to hash the NSID+keytag source index. Performing fewer double hash functions is preferred because it reduces the amount of processing required to identify a match with the NSID+keytag source index to retrieve an AES encryption key.

Referring to FIG. 9, the NSID+keytag source index is hashed with double hash functions H1, H2, and H3 to output 18 bit indexes. The 18 bit indexes are mapped to HOL link list tables. As shown in FIG. 9, four HOL redirection tables are provided, thereby reducing the possibility of a conflict by a factor of four. The HOL link list tables may be provided on the SRAM (e.g., on chip). Therefore, the HOL link list tables can be used to quickly point to an entry in an AES storage with a reduced possibility of a conflict (and an increased possibility of being a match). Additionally, the number of probes are not be limited to the above-described examples. For example, two or more probes may be used to carry out a multiple probe implementation.

FIG. 10 is a table illustrating five multiple hash index probe types and corresponding application scenarios, according to an embodiment. The five multiple hash index probe types referred to in FIG. 10 are merely exemplary, and additional probe types may be applied. Further, the application scenarios are similarly exemplary, and additional application scenarios may be applied.

Referring to FIG. 10, a first type of multiple hash index probe may be a sequential multiple hash probe (e.g., similar to the embodiment illustrated in FIG. 7), which may be used by a DRAM controller performing page-miss or start-of-row for each read command.

Another type of multiple hash index probe may be a concurrent issue probe mode (e.g., similar to the embodiment illustrated in FIG. 8), which may be used by a DRAM controller performing page-hit access back-to-back for each read or write command.

Another type of multiple hash index probe may be a program selectable sequential or concurrent probe mode. In this case, the sequential or concurrent probe type may be selected based on an instruction (e.g., an instruction from the DRAM controller).

Another type of multiple hash index probe may be a dynamic adaptive sequential and concurrent mode. In this case, the probing mode may depend on the last data entry or a predetermined number of last data entries (e.g., applying a calculation based on a sliding window of the last 16 entries). For example, if accessing an entry in DRAM using sequential probing results in multiple conflicts to access the entry, then when the next entry is accessed, the probing mode may be switched from sequential to concurrent so that the data entry can more efficiently be accessed.

Another type of multiple hash index probe may be a progressive dynamic adaptive mode. In this case, the probing mode may switch between sequential and concurrent and change the number of double hash functions applied to the source index based on the last data entry or a predetermined number of last data entries (e.g., applying a calculation based on a sliding window of the last 16 entries). For example, if sequential hashing is used and accessing a data entry results in a conflict, then the probing mode for the next entry may be switched from sequential to concurrent and the number of double hash functions applied may be increased by 1.

FIG. 11 is a table comparing memory access attributes of the embodiments of FIG. 2, FIG. 3, FIG. 4, FIG. 7, FIG. 8, and FIG. 9 for Add/Delete/Reorder/Traverse commands, according to an embodiment.

Referring to FIG. 11, the table incorporates the findings of the table previously presented in FIG. 5 with respect to the embodiments presented in FIG. 2, FIG. 3, and FIG. 4. Therefore, the aforementioned description of FIG. 5 may be referenced to describe the findings with respect to FIG. 2, FIG. 3, and FIG. 4.

In addition, the table presented in FIG. 11 presents attributes for the sequential double hash method (e.g., FIG. 7), the concurrent double hash method (e.g., FIG. 8), and the expansion redirection table double hash method (e.g., FIG. 9).

Considering the sequential double hash method (e.g., FIG. 7), in order to obtain an encryption key, a first double hash is performed and DRAM.1 is accessed. There is a 50% chance of a conflict. If a conflict exists, then a second double hash is performed and DRAM.2 is accessed. The average access time to DRAM.2 takes 0.5× relative to DRAM.1. Therefore, the average memory access time for performing two double hash functions 1.5×(1×+0.5×).

The entry size of the sequential double hash method may be 65,536 (64B+3B).

Considering the concurrent double hash method (e.g., FIG. 8), in order to obtain an encryption key, a first double hash is performed concurrently with at least one other double hash. Therefore, if two double hash functions are concurrently performed on a source index, DRAM.1 and DRAM. 2 are accessed. The average access time to DRAM.1 is 1× and the approximate average access time to DRAM.2 is ~0×. Therefore, the average memory access time for performing two double hash functions is ~1×. Although the average memory access time appears to be low, it is difficult to predict the number of concurrent double hashes necessary to obtain an encryption or decryption key from memory. Therefore, performing a large number of concurrent double hashes may be necessary to ensure access to the encryption key, which is undesirable.

The entry size of the concurrent double hash method may be (4+1)×65,536 (64B+3B). The overall likelihood of a conflict occurring at H1 in the embodiment shown in FIG. 8 is 0.1 (10%), assuming the possibility of a conflict for a single hash is 0.5 (50%). The likelihood of the conflict occurring at H1 is determined based on the five hash functions H1-H5 concurrently splitting the possibility of the conflict occurring amongst them (the 0.1 overall conflict possibility is determined by dividing the possibility of a conflict for a single hash (0.5) by the number of hash functions (5)). Therefore, the overall likelihood of a conflict occurring at H1 in the embodiment shown in FIG. 8 is 0.1 (0.1=0.5/5).

Considering the expansion redirection table double hash method (e.g., FIG. 9), in order to obtain an encryption key, SRAM is accessed. A first double hash function is performed when accessing the SRAM. Access to the SRAM is very fast compared to the DRAM. For example, SRAM access time may take 2 ns-5 ns and DRAM may take 50 ns-70 ns. A normalized SRAM value is assumed to be 0.1× of DRAM. However, faster access times to SRAM are possible. A second double hash function is performed when accessing DRAM.1. Therefore, the average memory access time for performing two double hash functions is 1.1×. In addition, the expansion redirection table has the effect of reducing the load factor and therefore reducing the likelihood of a conflict, thereby improving the possibility of identifying a match to an encryption key. In the case of FIG. 9, the redirection table further reduces the overall likelihood of a conflict occurring at H1 by a factor of 4. Therefore, assuming the possibility of a conflict for a single hash is 0.5 (50%), the overall conflict possibility of FIG. 9 at H1 is 0.025 or 2.5% (0.025=(0.5/5)/4), since the five hash functions H1-H5 concurrently split the possibility of conflict of the single hash (0.5/5), and the redirection table further reduces the overall likelihood of the conflict occurring at H1 by a factor of 4 (/4).

The entry size of the expansion redirection table double hash method may be 65,536 (64B+3B) (for the storage portion (e.g., secondary memory))+4×65,536 (2B) (for the expansion redirect portion primary memory)).

For each of the methods corresponding to FIGS. 7-9, the adding and deleting operations include opening a hashed index and invalidating an entry, respectively. The adding and deleting operations of opening a hashed index and invaliding an entry (or invalidating a redirect entry, as is the case for the expansion redirection table double hash method) are significantly less complex than the adding and deleting operations of adding to a TOL and deleting and relinking, corresponding to the chaining hash methods corresponding to FIGS. 2-4.

For each of the methods corresponding to FIGS. 7-9, reordering the MFU entry necessitates swapping an entry association, which is more complex than copying the MFU to the HOL (which may be used in linked list methods) because swapping an entry association requires moving the actual data included in stored in each address that is swapped (e.g., moving the 512b encryption key from one address to another address).

Figure 12:
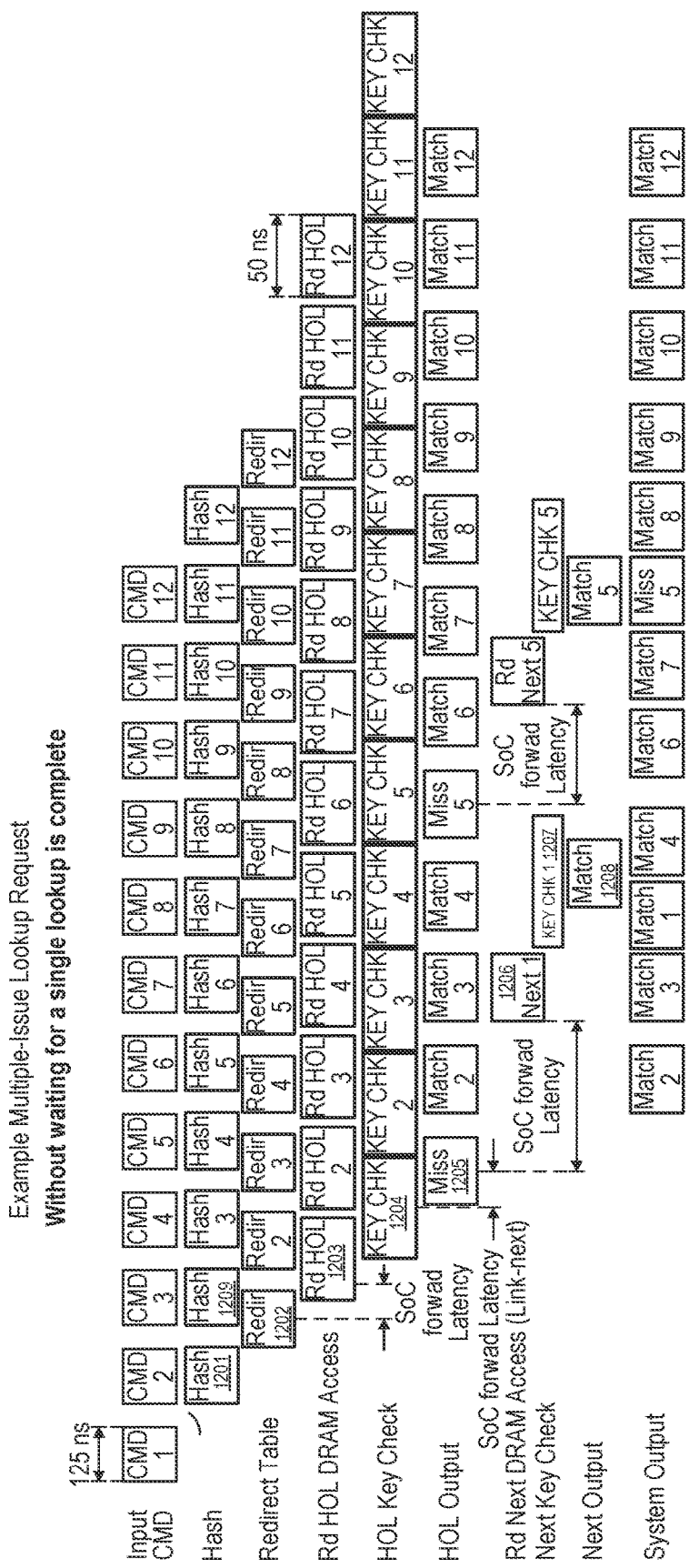
FIG. 12 is a timing diagram illustrating performing a second lookup request without waiting for completion of a first lookup request, according to an embodiment.

FIG. 12 is a timing diagram illustrating performing a second lookup request without waiting for completion of a first lookup request, according to an embodiment. The solution proposed in the timing diagram may be implemented by a controller and improve the overall latency of accessing the DRAM because multiple lookup request can be performed simultaneously.

Referring to FIG. 12, a 125ns cycle is shown, and a CMD is input every 125ns. The 125ns cycle value is exemplary and other values may be used. In order to perform a lookup request using a link list, a source key is hashed at 1201 and a redirect table is accessed at 1202. The commands 1201 and 1202 may be performed in static memory and, therefore, latency is small.

Next, HOL DRAM is accessed at 1203. The time it takes to access DRAM is long compared to SRAM, and thus an SoC forward latency is incurred when accessing HOL DRAM at 1203. At 1204, an HOL key is checked and, at 1205, a conflict determination of the HOL is output. When the HOL is output, the result may either be a miss (a conflict) or a match. The HOL is output, and therefore an SoC response latency is incurred.

When the HOL output at 1205 is a match, then no further commands are needed to identify the encryption key. If the HOL output at 1205 is a miss (conflict), then a second storage address of DRAM may be accessed at 1206 after incurring an SoC forward latency delay. A key of the second storage address is checked at 1207 and a conflict determination is output at 1208. As shown in FIG. 12, the output at 1208 is a match and therefore no further commands are needed to identify the encryption key.

Notably, the signaling configuration of FIG. 12 does not wait for a match to be identified (e.g., at 1208) before hashing a second source index at 1209 to begin to identify a second encryption key. In other words, the signaling configuration of FIG. 12 instructs hashing a second source index at 1209 even if the output at 1205 is a miss and results in a conflict. Therefore, the signaling configuration is capable of simultaneously obtaining two or more encryption keys.

FIG. 12 illustrates the case in which sequential hashing is performed since an individual hash is performed at 1201. However, the signaling configuration is also applicable to concurrent hashing and two or more hashes may be simultaneously performed at 1201. If two or more hashes are simultaneously performed then the SoC forward latency time and the SoC response latency time will be more than if an individual hash is performed at 1201. Additionally, although FIG. 12 illustrates a lookup-request performed for accessing an address stored in DRAM, other memory types may be used. For example, the the lookup-requests described in the present application may be performed for accessing information stored on SRAM, flash memory, remote servers, on-chip memory devices, or additional memory types.

Figure 13:
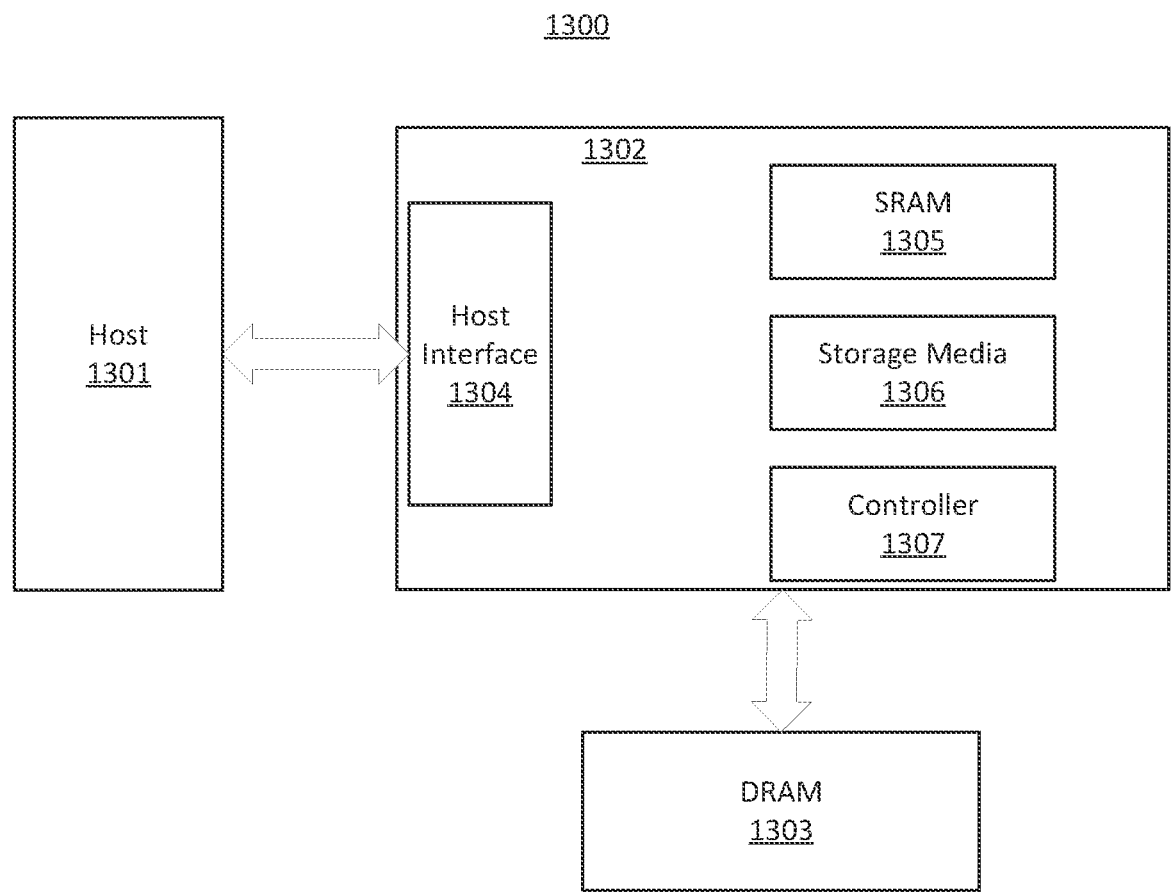
FIG. 13 is a memory system illustrating structural components for performing embodiments described in the present application, according to an embodiment.

FIG. 13 is a memory system illustrating structural components for performing embodiments described in the present application, according to an embodiment.

The operations described in FIGS. 1-12 may be performed by a controller stored in memory, a processor, or computer-implemented instructions. For instance, instructions performed by the controller may be implemented using as an FPGA, an ASIC, a general purpose computer, or by a remote processing system (e.g., a cloud computing system).

Referring to FIG. 13, a memory system 1300 capable of performing the embodiments described in the present application is shown. The memory system 1300 includes a host 1301, an IC 1302 (e.g., a memory buffer chip) and DRAM (e.g., a nonvolatile memory) 1303. Although DRAM is shown separate from the IC 1302, the DRAM may be included on the IC 1302.

The IC 1302 includes a host interface 1304, SRAM (e.g., a volatile memory) 1305, storage media (e.g., flash memory) 1306 and a controller 1307. The host interface 1304 may communicate information from the host 1301 to the IC 1302 or from the IC 1302 to the host 1301. The SRAM 1305 may be relatively small in size compared to the DRAM 1303. However, the SRAM 1305 may have faster read/write speeds than the DRAM 1303. In addition, the storage media 1306 may store data to be transmitted to or from the host 1301 and/or the DRAM 1303.

The embodiments described in the present application provide particular configurations to improve accessing stored information and, in particular, accessing stored information for KPIO systems. The storage system illustrated in FIG. 13 provides a structure for realizing the embodiments of the present application. It is noted, however, that the embodiments of the present application should not be limited to the structure of FIG. 13, as one of ordinary skill in the art would recognize that other memory storage systems may be applied to implement the embodiments of the present application.

Figure 14:
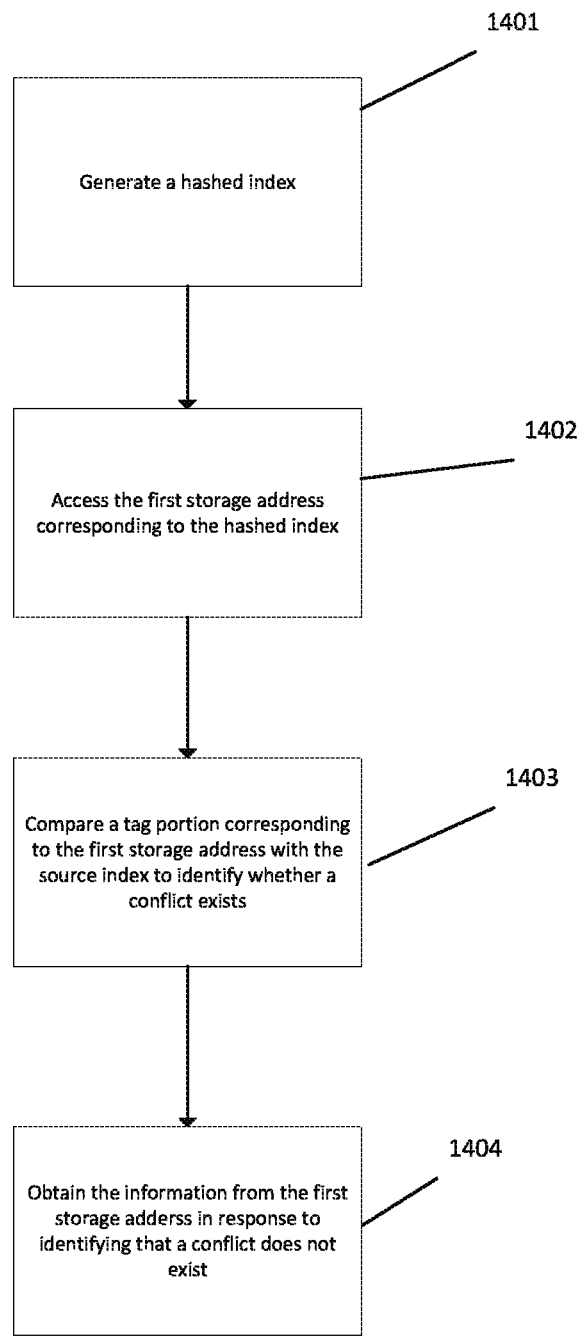
FIG. 14 is a flowchart illustrating accessing a stored entry, according to an embodiment.

FIG. 14 is a flowchart illustrating accessing a stored entry, according to an embodiment.

The steps described in FIG. 14 may be performed by a controller stored in memory, a processor, or computer-implemented instructions.

Referring to FIG. 14, at step 1401 a source index is hashed to generate a hashed index. The hashed index may be a predetermined number of bits (e.g., 16 bits or 18 bits), and may be a hash of a source index including a NSID and a keytag.

In step 1402, a first storage address is accessed corresponding to the hashed index. The first storage address may be included in a primary memory or a secondary memory. The primary memory may be SRAM or DRAM. The secondary memory is likely to be DRAM (and not SRAM).

In step 1403 a tag portion corresponding to the first storage address is compared with the source index to identify whether a conflict exists. The tag portion may be the same number of bits as the source index (e.g., both may be 24 bits).

In step 1404, the information from the first storage address is obtained in response to identifying that a conflict does not exist in step 1403. The obtained information may be an encryption or a decryption key of a predetermined size (e.g., 512 bits)

If a conflict does exist, then a number of different options may ensue (e.g., folded linked list, secondary memory linked list, reroute table with a linked list, MFU with a linked list, sequential double hash conflict resolution, concurrent double hash conflict resolution, HOL reroute table with double hash conflict resolution, etc.).

Figure 15:
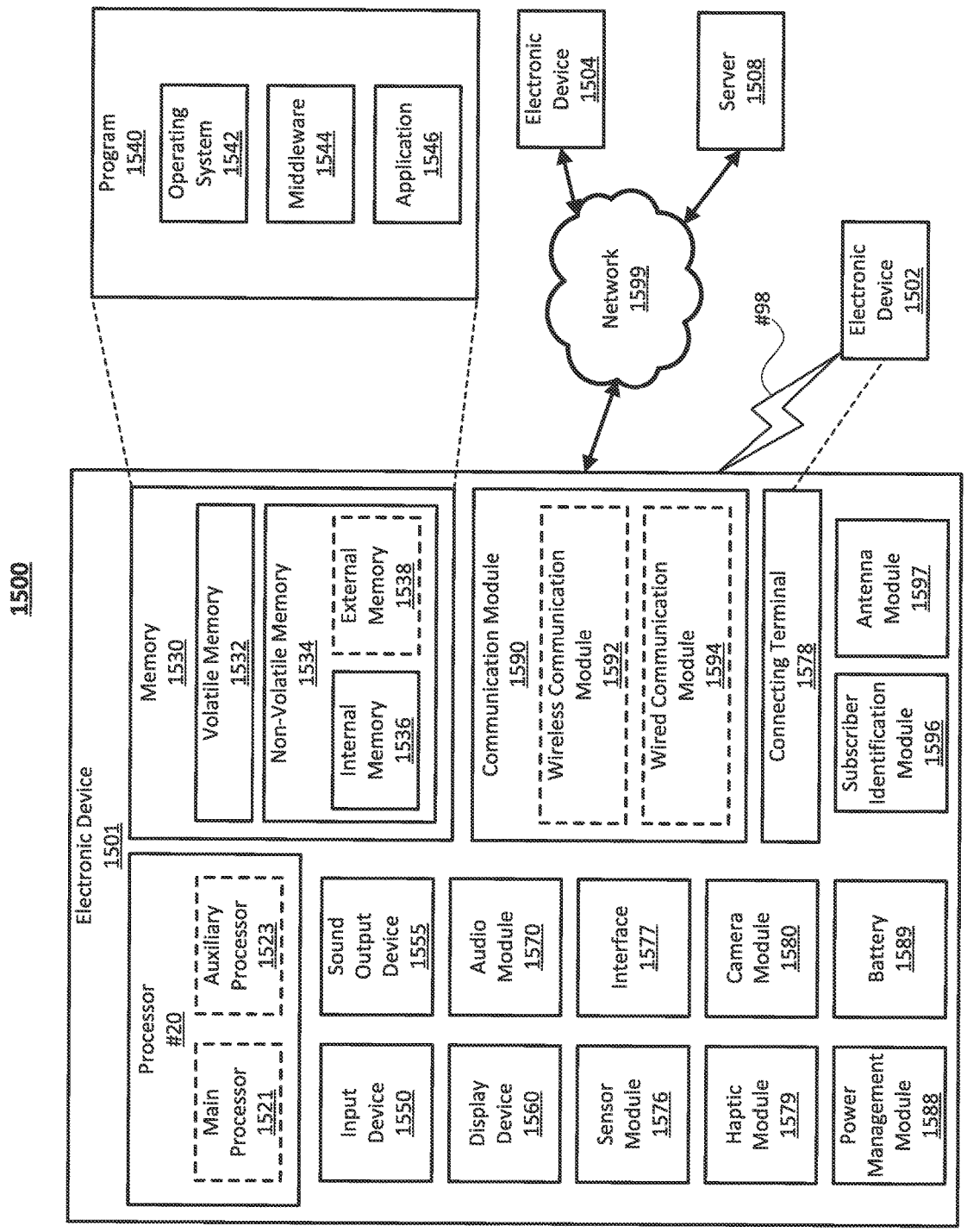
FIG. 15 illustrates an electronic device in a network environment, according to an embodiment.

FIG. 15 illustrates an electronic device in a network environment, according to an embodiment.

Referring to FIG. 15, the electronic device 1501, e.g., a mobile terminal including GPS functionality, in the network environment 1500 may communicate with an electronic device 1502 via a first network 1598 (e.g., a short-range wireless communication network), or an electronic device 1504 or a server 1508 via a second network 1599 (e.g., a long-range wireless communication network). The electronic device 1501 may communicate with the electronic device 1504 via the server 1508. The electronic device 1501 may include a processor 1520, a memory 1530, an input device 1550, a sound output device 1555, a display device 1560, an audio module 1570, a sensor module 1576, an interface 1577, a haptic module 1579 a camera module 1580, a power management module 1588, a battery 1589, a communication module 1590, a subscriber identification module (SIM) 1596, or an antenna module 1597 including a GNSS antenna. In one embodiment, at least one (e.g., the display device 1560 or the camera module 1580) of the components may be omitted from the electronic device 1501, or one or more other components may be added to the electronic device 1501. In one embodiment, some of the components may be implemented as a single IC. For example, the sensor module 1576 (e.g., a fingerprint sensor, an iris sensor, or an illuminance sensor) may be embedded in the display device 1560 (e.g., a display).

The processor 1520 may execute, for example, software (e.g., a program 1540) to control at least one other component (e.g., a hardware or a software component) of the electronic device 1501 coupled with the processor 1520, and may perform various data processing or computations. As at least part of the data processing or computations, the processor 1520 may load a command or data received from another component (e.g., the sensor module 1576 or the communication module 1590) in volatile memory 1532, process the command or the data stored in the volatile memory 1532, and store resulting data in non-volatile memory 1534. The processor 1520 may include a main processor 1521 (e.g., a central processing unit (CPU) or an application processor, and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 may be adapted to consume less power than the main processor 1521, or execute a particular function. The auxiliary processor 1523 may be implemented as being separate from, or a part of, the main processor 1521.

The auxiliary processor 1523 may control at least some of the functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to one embodiment, the auxiliary processor 1523 (e.g., an image signal processor or a communication processor) may be implemented as part of another component (e.g., the camera module 1580 or the communication module 1590) functionally related to the auxiliary processor 1523.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by other component (e.g., the processor 1520) of the electronic device 1501, from the outside (e.g., a user) of the electronic device 1501. The input device 1550 may include, for example, a microphone, a mouse, or a keyboard.

The sound output device 1555 may output sound signals to the outside of the electronic device 1501. The sound output device 1555 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. According to one embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to one embodiment, the audio module 1570 may obtain the sound via the input device 1550, or output the sound via the sound output device 1555 or a headphone of an external electronic device 1502 directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. The sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device 1502 directly (e.g., wiredly) or wirelessly. According to one embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device 1502. According to one embodiment, the connecting terminal 1578 may include, for example, an HDMI connector, a USB connector, an SD card connector, or an audio connector (e.g., a headphone connector).

The haptic module 1579 may convert an electrical signal into a mechanical stimulus (e.g., a vibration or a movement) or an electrical stimulus which may be recognized by a user via tactile sensation or kinesthetic sensation. According to one embodiment, the haptic module 1579 may include, for example, a motor, a piezoelectric element, or an electrical stimulator.

The camera module 1580 may capture a still image or moving images. According to one embodiment, the camera module 1580 may include one or more lenses, image sensors, image signal processors, or flashes.

The power management module 1588 may manage power supplied to the electronic device 1501. The power management module 1588 may be implemented as at least part of, for example, a power management integrated circuit (PMIC).

The battery 1589 may supply power to at least one component of the electronic device 1501. According to one embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor) and supports a direct (e.g., wired) communication or a wireless communication. According to one embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or a standard of the Infrared Data Association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. According to one embodiment, the antenna module 1597 may include one or more antennas, and, therefrom, at least one antenna appropriate for a communication scheme used in the communication network, such as the first network 1598 or the second network 1599, may be selected, for example, by the communication module 1590 (e.g., the wireless communication module 1592). The signal or the power may then be transmitted or received between the communication module 1590 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. All or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

One embodiment may be implemented as software (e.g., the program 1540) including one or more instructions that are stored in a storage medium (e.g., internal memory 1536 or external memory 1538) that is readable by a machine (e.g., the electronic device 1501). For example, a processor of the electronic device 1501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of a memory device, comprising:
   generating, by a controller of the memory device, a first hashed index by hashing a source index comprising a namespace identification (NSID) and a keytag with a first hash function;
   generating, by the controller, a second hashed index by hashing the source index comprising the NSID and the keytag with a second hash function;
   accessing, by the controller, a first storage address corresponding to the first hashed index or the second hashed index;
   comparing, by the controller, a tag portion corresponding to the first storage address with the source index to identify whether a conflict exists; and
   in response to identifying whether the conflict exists, obtaining, by the controller, information from the first storage address.

2. The method of claim 1, wherein the first storage address is comprised in a first memory, and
   wherein comparing, by the controller, the tag portion corresponding to the first storage address with the source index to identify whether the conflict exists further comprises:
   in response to identifying that the conflict exists, linking, by the controller, the first storage address in the first memory to an empty second storage address in the first memory.

3. The method of claim 1, wherein the first storage address is comprised in a first memory,
   wherein comparing, by the controller, the tag portion corresponding to the first storage address with the source index to identify whether the conflict exists further comprises:
   in response to identifying that the conflict exists, linking, by the controller, the first storage address in the first memory to an empty second storage address in a second memory.

4. The method of claim 1, wherein a redirection index pointing to the first storage address is comprised in a first type of memory that includes more entries than a second type of memory, and
   wherein the first hashed index or the second hashed index additionally includes portion of bits configured to point to the redirection index in the first type of memory that points to the first storage address in the second type of memory.

5. The method of claim 4, further comprising:
   determining, by the controller, a most frequently used (MFU) entry by counting, at least, the most recent entry accessed on the second type of memory; and
   adjusting, by the controller, an entry in the redirection index to point to the MFU entry on the second type of memory, and assigning a tail of line (TOL) of a first link list to point to a head of line (HOL) entry of a second link list.

6. The method of claim 1,
   further comprising:
   generating, by the controller, the first hashed index by hashing the source index using a first double hash function,
   comparing, by the controller, a tag portion corresponding to the first storage address with the source index to identify whether the conflict exists, and
   in response to identifying that the conflict exists, generating, by the controller, the second hashed index by hashing the source index using a second double hash function.

7. The method of claim 1,
   further comprising:
   concurrently generating, by the controller, the first hashed index by hashing the source index using a first double hash function and the second hashed index by hashing the source index using a second double hash function.

8. The method of claim 1,
   further comprising:
   determining, by the controller, whether to generate the first hashed index or the second hashed index according to a sequential double hash mode or a concurrent double hash mode based on a predetermined condition,
   wherein the predetermined condition is based on, at least one of, a prior throughput duration, a prior lookup dynamic random access memory (DRAM) transaction count as a dynamic selection, a static selection, or a progressive dynamic selection that is based on an accumulation of prior selection counts compared to a threshold.

9. The method of claim 1, wherein a head of line (HOL) link list index pointing to the first storage address is comprised in a static random access memory (SRAM) that includes at least 1.5× a number of entries than a number of entries in a dynamic random access memory (DRAM), and
   wherein the first hashed index or the second hashed index additionally includes a second predetermined number of bits in addition to a first predetermined number of bits and points to an entry in the HOL link list that points to the first storage address in DRAM.

10. A system, comprising:
    a memory; and
    a controller configured to:
    generate a first hashed index by hashing a source index comprising a namespace identification (NSID) and a keytag with a first hash function;
    generate a second hashed index by hashing the source index comprising the NSID and the keytag with a second hash function;
    access A first storage address corresponding to the first hashed index or the second hashed index;
    compare a tag portion corresponding to the first storage address with the source index to identify whether a conflict exists; and
    in response to identifying whether the conflict exists, obtain information from the first storage address.

11. The system of claim 10, wherein the first storage address is comprised in a first memory, and
    wherein comparing the tag portion corresponding to the first storage address with the source index to identify whether the conflict exists further comprises:

in response to identifying that the conflict exists, link, by the controller, the first storage address in the first memory to an empty second storage address in the first memory.

12. The system of claim 10, wherein the first storage address is comprised in a first memory,
wherein comparing the tag portion corresponding to the first storage address with the source index to identify whether the conflict exists further comprises:
in response to identifying that the conflict exists, link, by the controller, the first storage address in the first memory to an empty second storage address in a second memory.

13. The system of claim 10, wherein a redirection index pointing to the first storage address is comprised in a first type of memory that includes more entries than a second type of memory, and
wherein the first hashed index or the second hashed index additionally includes a portion of bits configured to point to the redirection index in the first type of memory that points to the first storage address in the second type of memory.

14. The system of claim 13, wherein the controller is further configured to:
determine a most frequently used (MFU) entry by counting, at least, the most recent entry accessed on the second type of memory; and
adjust an entry in the redirection index to point to the MFU entry on the second type of memory, and assigning a tail of line (TOL) of a first link list to point to a head of line (HOL) entry of a second link list.

15. The system of claim 10,
wherein the controller is further configured to:
generate the first hashed index by hashing the source index using a first double hash function,
compare a tag portion corresponding to the first storage address with the source index to identify whether the conflict exists, and
in response to identifying that the conflict exists, generate the second hashed index by hashing the source index using a second double hash function.

16. The system of claim 10, wherein
the controller is further configured to
concurrently generate the first hashed index by hashing the source index using a first double hash function and the second hashed index by hashing the source index using a second double hash function.

17. The system of claim 10, wherein
the controller is further configured to
determine whether to generate the first hashed index or the second hashed index according to a sequential double hash mode or a concurrent double hash mode based on a predetermined condition,
wherein the predetermined condition is based on, at least one of, a prior throughput duration, a prior lookup dynamic random access memory (DRAM) transaction count as a dynamic selection, a static selection, or a progressive dynamic selection that is based on an accumulation of prior selection counts compared to a threshold.

18. The system of claim 10, wherein a head of line (HOL) link list index pointing to the first storage address is comprised in a static random access memory (SRAM) that includes at least 1.5× a number of entries than a number of entries in a dynamic random access memory (DRAM), and
wherein the first hashed index or the second hashed index additionally includes a second predetermined number of bits in addition to a first predetermined number of bits and points to the first storage address in DRAM.

19. A storage device, comprising:
a controller; and
a storage medium,
wherein the controller is configured to:
generate a first hashed index by hashing a source index comprising a namespace identification (NSID) and a keytag with a first hash function;
generate a second hashed index by hashing the source index comprising the NSID and the keytag with a second hash function;
access a first storage address corresponding to the first hashed index or the second hashed index;
compare a tag portion corresponding to the first storage address with the source index to identify whether a conflict exists; and
in response to identifying whether the conflict exists, obtain the information from the first storage address.

20. The storage device of claim 19, wherein the first storage address is comprised in a first memory, and
wherein comparing the tag portion corresponding to the first storage address with the source index to identify whether the conflict exists further comprises:
in response to identifying that the conflict exists, linking, by the controller, the first storage address in the first memory to an empty second storage address in the first memory.

* * * * *